(12) United States Patent
Yanagawa

(10) Patent No.: US 10,379,787 B2
(45) Date of Patent: Aug. 13, 2019

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Katsuhiko Yanagawa, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/636,772

(22) Filed: Jun. 29, 2017

(65) Prior Publication Data
US 2018/0004458 A1   Jan. 4, 2018

(30) Foreign Application Priority Data

Jul. 4, 2016   (JP) ................................. 2016-132774

(51) Int. Cl.
*G06F 3/12*   (2006.01)
*G06F 21/60*   (2013.01)
*H04N 1/00*   (2006.01)

(52) U.S. Cl.
CPC .......... *G06F 3/1203* (2013.01); *G06F 3/1222* (2013.01); *G06F 3/1236* (2013.01); *G06F 3/1288* (2013.01); *G06F 3/1296* (2013.01); *G06F 21/608* (2013.01); *H04N 1/00244* (2013.01)

(58) Field of Classification Search
None
See application file for complete search history.

(56) References Cited

U.S. PATENT DOCUMENTS

| | | | |
|---|---|---|---|
| 2005/0206962 A1* | 9/2005 | Nakayama | G03G 15/50 358/448 |
| 2015/0071211 A1* | 3/2015 | Seok | H04W 74/04 370/329 |
| 2015/0116753 A1* | 4/2015 | Sato | G06F 3/1238 358/1.14 |
| 2016/0081015 A1* | 3/2016 | Nakano | H04W 72/1215 455/552.1 |

FOREIGN PATENT DOCUMENTS

JP   2005045368 A   2/2005

* cited by examiner

*Primary Examiner* — Frantz Bataille
(74) *Attorney, Agent, or Firm* — Rossi, Kimms & McDowell LLP

(57) ABSTRACT

This information processing apparatus can operate first wireless communication in parallel with second wireless communication whose communication standard is different from that of the first wireless communication by sequentially operating the first wireless communication and the second wireless communication. In addition, this information processing apparatus determines whether or not a parallel operation in which the second wireless communication is operated in parallel with and in addition to the first wireless communication is to be performed, and decides the transmission interval of the first wireless communication based on the determination result.

20 Claims, 20 Drawing Sheets

FIG. 6

| PRIORITY ORDER | 1 | 2 | 3 | 4 | — |
|---|---|---|---|---|---|
| COMMUNICATION STATE | BLE TRANSMISSION (INCLUDING BEACON TRANSMISSION) | BLE RECEPTION | WLAN TRANSMISSION | WLAN RECEPTION | IDLE |
| SWITCHING UNIT SELECTED PORT | 19c | 19b | 19a | 19b | 19b |

F I G. 16

| WIRELESS LAN | OFF | ON |
|---|---|---|
| BLE BEACON INTERVAL | 30ms | 100ms |

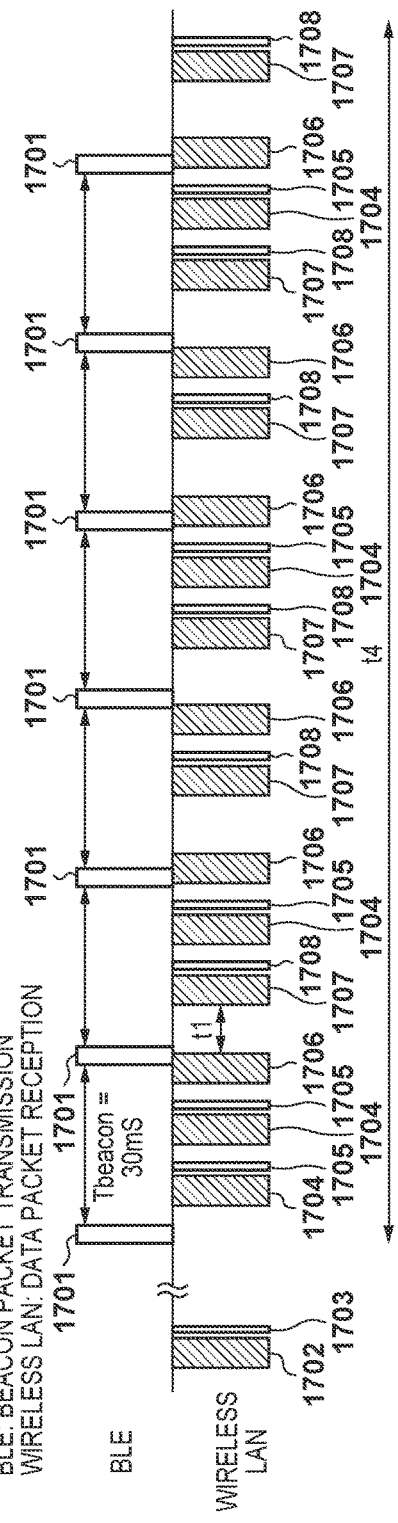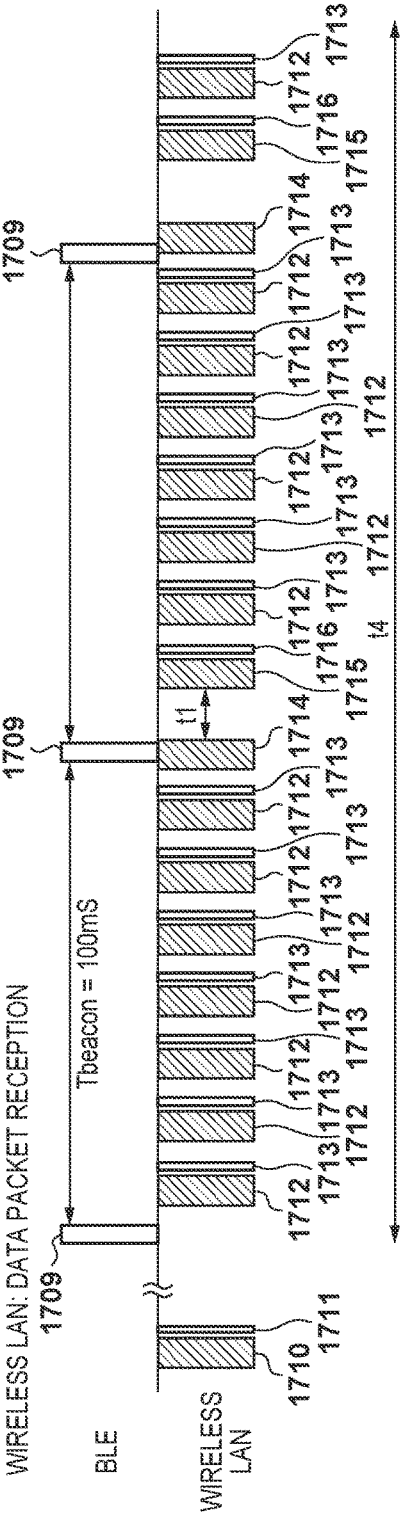

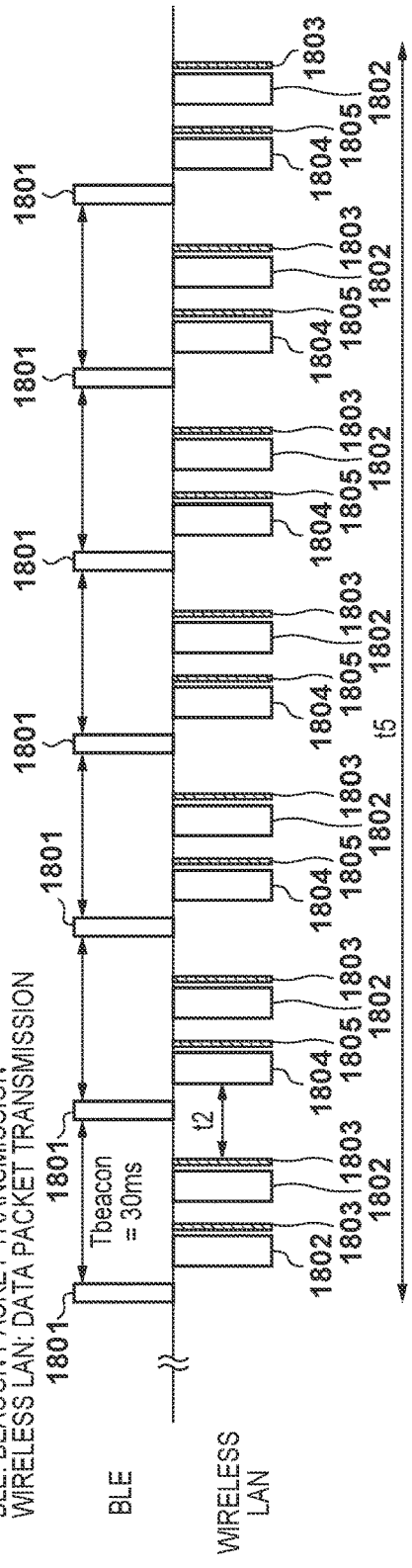
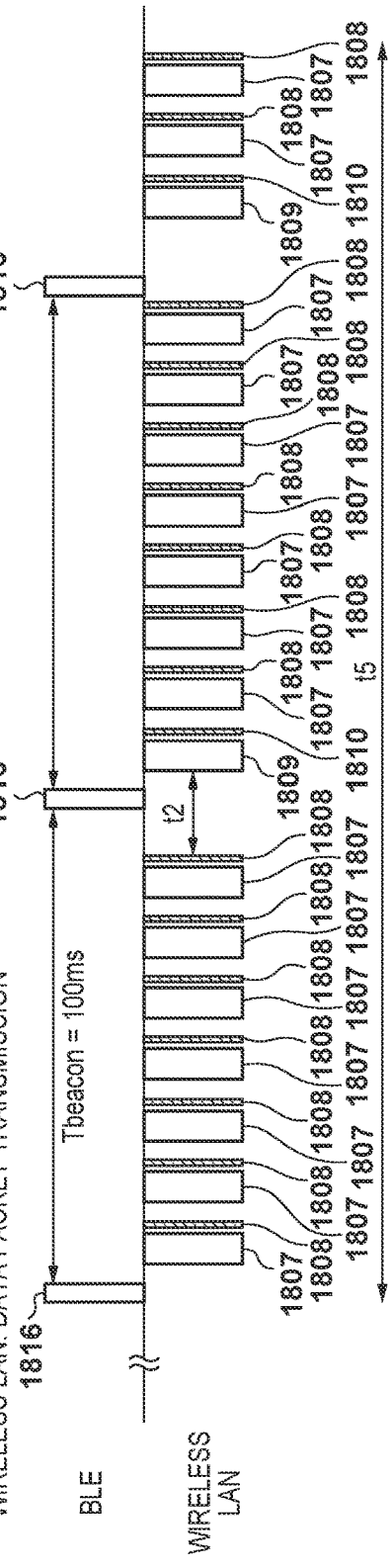

FIG. 19

| WIRELESS LAN | OFF | ON | ON | ON |
|---|---|---|---|---|
| INFRASTRUCTURE | OFF | ON | OFF | ON |
| WiFi DIRECT | OFF | OFF | ON | ON |
| BLE BEACON INTERVAL | 30ms | 50ms | 70ms | 100ms |

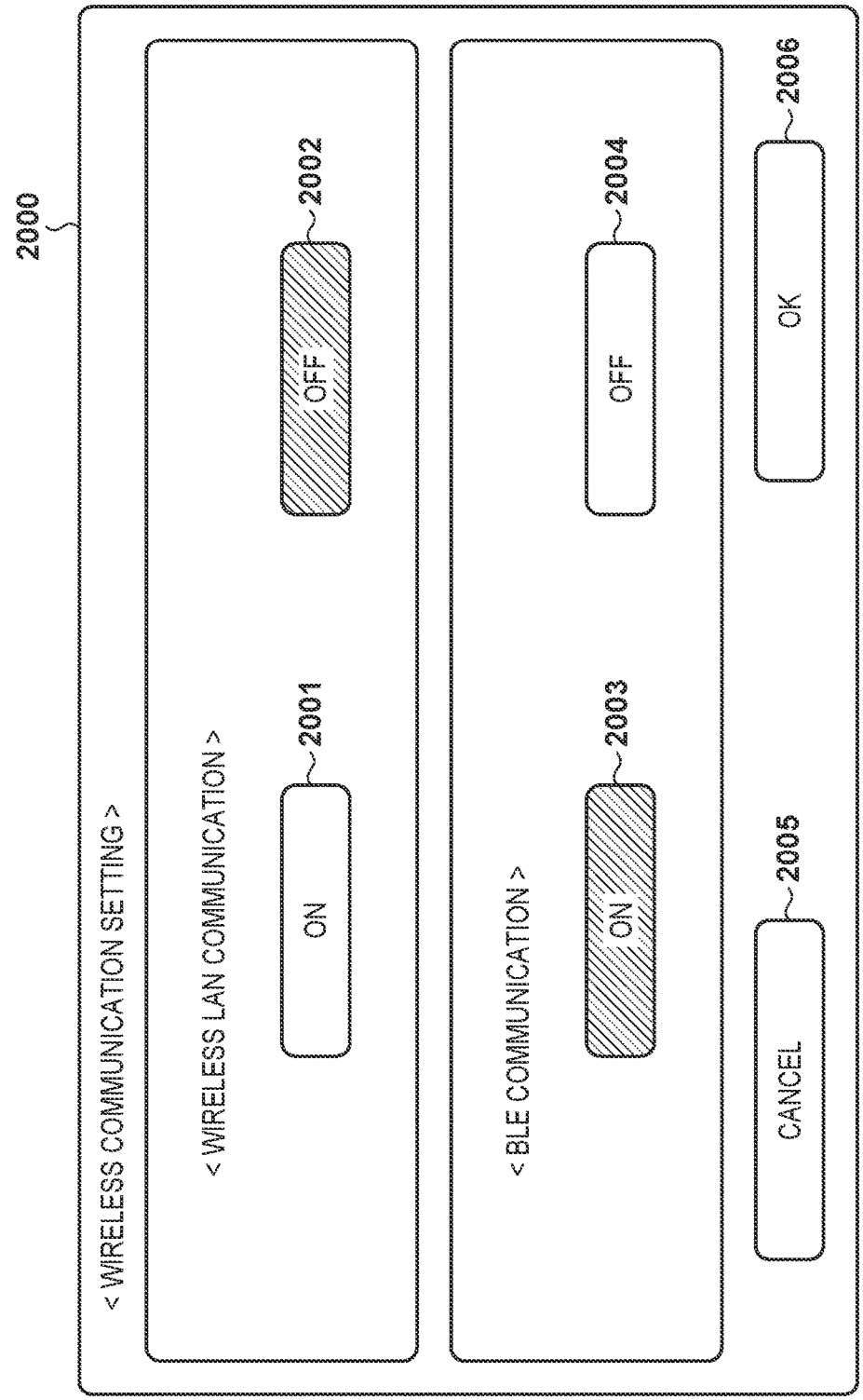

INFORMATION PROCESSING APPARATUS, CONTROL METHOD THEREOF, AND STORAGE MEDIUM

BACKGROUND OF THE INVENTION

Field of the Invention

The present invention relates to an information processing apparatus that can use wireless communication realized by a plurality of different methods, a control method thereof, and a storage medium.

Description of the Related Art

In recent years, the convenience of portable terminal devices has significantly improved due to advances in wireless communication techniques, and in place of personal computers and the like that have been used so far, the spread of portable terminal devices is rapidly advancing. Portable terminal devices, which have been used as a personal connection tool, are now used for business use, and the use of portable terminal devices is spreading at such a rapid pace as to replace personal computers.

In addition, consequently, information processing apparatuses that perform the printing and scanning of documents, the transfer of various types of data and the like by cooperating with a portable terminal device using wireless communication have been becoming common mainly in business use. Currently, there have been advancements in particularly the spread of wireless communication techniques that utilize the 2.4 GHz ISM (Industrial, Scientific and Medical) band as wireless communication used in these apparatuses. For example, wireless LANs based on IEEE 802.11 standards have already been generally adopted as a wireless communication method in portable terminal devices and other such apparatuses.

In addition, as another wireless communication method, Bluetooth (registered trademark) aimed at wireless communication with a portable terminal device and the like at a short distance by using the ISM bands similarly has been adopted increasingly. In recent years, the Bluetooth Low Energy (hereinafter, abbreviated as BLE) standard aimed at reducing power consumption has been developed in addition to Bluetooth, and is expected to become further widespread. These wireless communication methods have different characteristics, and are used differently by users, and thus as a tendency in recent years, there has been demand for one apparatus to be compatible with as many wireless communication methods as possible.

In view of this, in the case of an apparatus compatible with a plurality of different wireless communication methods in which the ISM band is used, the different wireless communication methods need to be operated at the same time while using the same frequency band, and thus various considerations in design need to be given. For example, Japanese Patent Laid-Open No. 2005-45368 proposes a technique for avoiding communication interference when a wireless LAN and Bluetooth are used at the same time. According to Japanese Patent Laid-Open No. 2005-45368, wireless communication using a wireless LAN and wireless communication using Bluetooth are controlled in a time division manner, and the transmission interval of Bluetooth control data is changed according to the packet size of wireless LAN user data. By performing packet communication of wireless LAN user data between the transmission intervals of Bluetooth control data, the transmission of Bluetooth control data is prevented from becoming the source of interference with wireless communication using the wireless LAN.

However, there is the following issue with the above conventional technique. For example, in recent years, as the use of portable terminal devices spreads in business use, the expansion of functions for cooperating with portable terminal devices is also demanded in information processing apparatuses. Therefore, as a wireless communication function in information processing apparatuses, not only compatibility with a wireless LAN that is conventionally common but also compatibility with BLE has been advancing.

On the other hand, a technique for detecting the position of a portable terminal device using a BLE beacon has been proposed as an application that uses a portable terminal device. In this technique, beacons transmitted at a certain time interval are received by the portable terminal device, and thereby the relative distance between the transmission source of the beacons and the portable terminal device is obtained based on the Received Signal Strength Indicator (RSSI) of the beacons.

Therefore, by providing compatibility with BLE in an information processing apparatus as well, it is conceivable to transmit a beacon, obtain the distance to the portable terminal device with which the information processing apparatus cooperates, and provide various services. Therefore, the information processing apparatus needs to be capable of a parallel operation in which data communication using a wireless LAN is performed while BLE beacons are transmitted at a certain interval. In order to handle this, it is conceivable for the information processing apparatus to be capable of the parallel operation by performing control to switch between transmission of beacons using BLE and data communication using the wireless LAN in a time division manner. However, in this case, communication control is performed by alternatingly switching between BLE and the wireless LAN, and thus data communication using the wireless LAN needs to be suspended during beacon transmission using BLE. Therefore, there is a problem in that the throughput of the wireless LAN decreases during the parallel operation of BLE and the wireless LAN compared with the case where only data communication using the wireless LAN is performed without performing the parallel operation.

SUMMARY OF THE INVENTION

The present invention enables realization of a mechanism for, even in the case of performing a parallel operation by a plurality of communication methods, mitigating a decrease in the throughput of communication by one of the communication methods.

One aspect of the present invention provides an information processing apparatus being capable of operating first wireless communication in parallel with second wireless communication whose communication standard is different from that of the first wireless communication, by sequentially operating the first wireless communication and the second wireless communication, the apparatus comprising: a first wireless communication unit configured to perform the first wireless communication; a second wireless communication unit configured to perform the second wireless communication; a memory device that stores a set of instructions; and at least one processor that executes the instructions to: determine whether or not a parallel operation in which the second wireless communication performed by the second wireless communication unit is operated in parallel with and in addition to the first wireless communication performed by the first wireless communication unit is to be performed; and decide a transmission interval of the first wireless communication based on a determination result.

Another aspect of the present invention provides a control method for an information processing apparatus being capable of operating first wireless communication in parallel with second wireless communication whose communication standard is different from that of the first wireless communication, by sequentially operating the first wireless communication and the second wireless communication, and that includes a first wireless communication unit configured to perform the first wireless communication, a second wireless communication unit configured to perform the second wireless communication, a memory device that stores a set of instructions, and at least one processor that executes the instructions, the control method comprising: determining whether or not a parallel operation in which the second wireless communication performed by the second wireless communication unit is operated in parallel with and in addition to the first wireless communication performed by the first wireless communication unit is to be performed; and deciding a transmission interval of the first wireless communication based on a determination result.

Another aspect of the present invention provides a non-transitory computer-readable storage medium storing a computer program for causing a computer to execute steps of a control method for an information processing apparatus being capable of operating first wireless communication in parallel with second wireless communication whose communication standard is different from that of the first wireless communication, by sequentially operating the first wireless communication and the second wireless communication, and that includes a first wireless communication unit configured to perform the first wireless communication, a second wireless communication unit configured to perform the second wireless communication, a memory device that stores a set of instructions, and at least one processor that executes the instructions, the control method comprising: determining whether or not a parallel operation in which the second wireless communication performed by the second wireless communication unit is operated in parallel with and in addition to the first wireless communication performed by the first wireless communication unit is to be performed; and deciding a transmission interval of the first wireless communication based on a determination result.

Further features of the present invention will be apparent from the following description of exemplary embodiments with reference to the attached drawings.

BRIEF DESCRIPTION OF THE DRAWINGS

FIG. 6 is a diagram showing the priority order of wireless communication of the information processing apparatus.

FIG. 16 is a diagram showing the relationship between wireless LAN usage and Tbeacon settings.

FIGS. 17A and 17B are diagrams showing a parallel operation of BLE beacon packet transmission and wireless LAN data reception.

FIGS. 18A and 18B are diagrams showing a parallel operation of BLE beacon packet transmission and wireless LAN data transmission.

FIG. 19 is a diagram showing the relationship between wireless LAN operation modes and Tbeacon settings.

FIG. 20 is a diagram showing a display example of an operation panel.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Information Processing Apparatus

Figure 1:
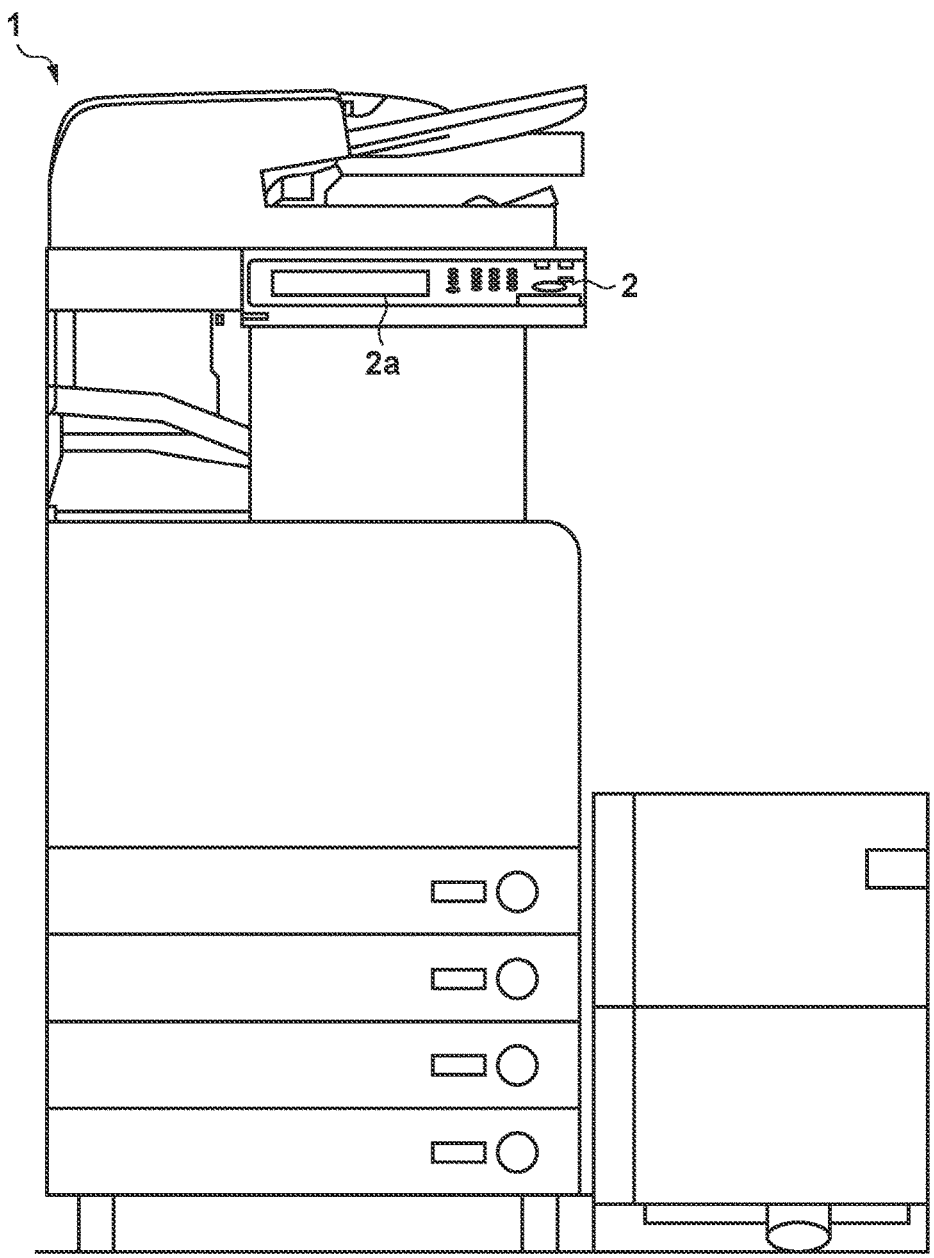
FIG. 1 is a diagram showing an example of an information processing apparatus.
Figure 2:
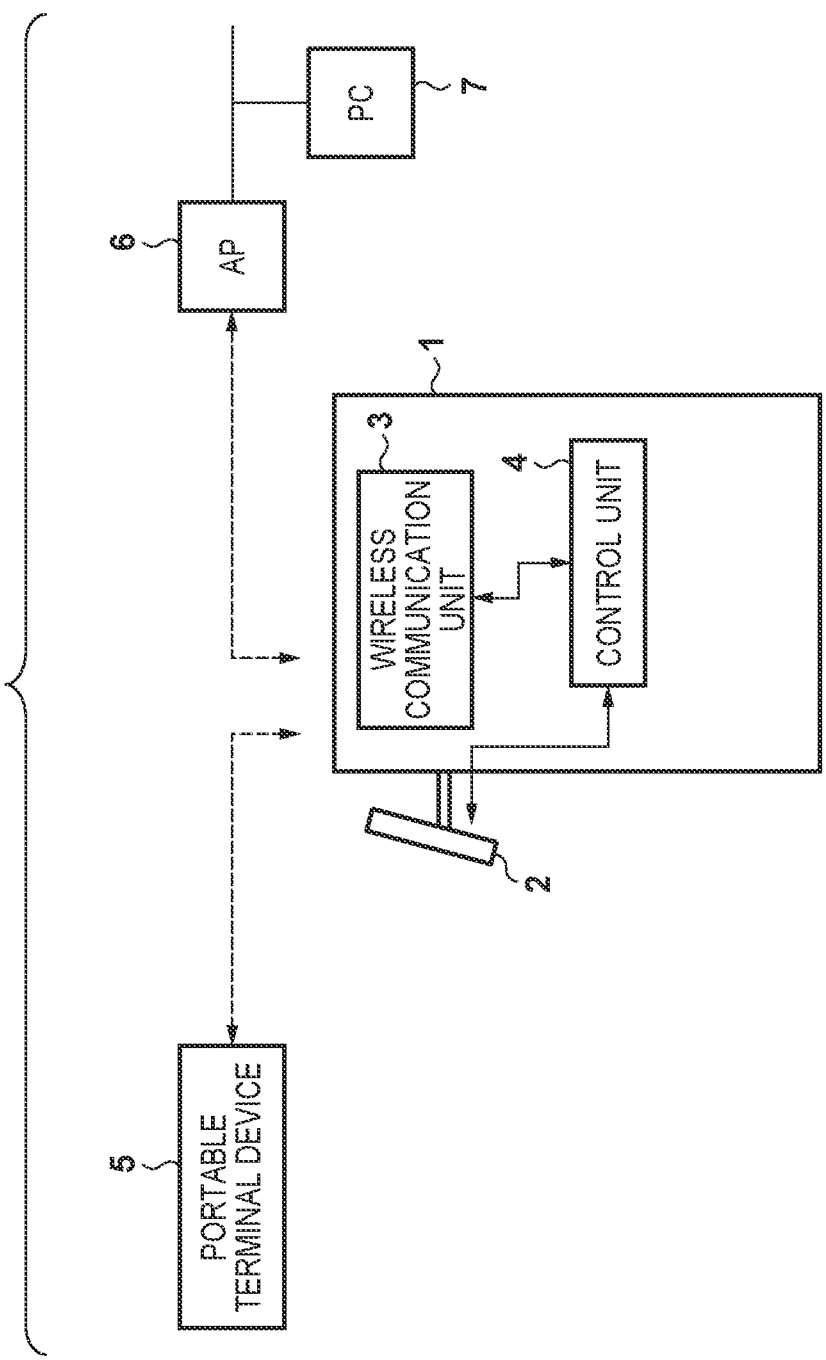
FIG. 2 is a diagram showing an overview of the apparatus structure of the information processing apparatus.

A first embodiment of the present invention will be described below. First, an information processing apparatus according to this embodiment will be described with reference to FIGS. 1 and 2. FIG. 1 shows the appearance of the information processing apparatus, and FIG. 2 shows the internal configuration of the information processing apparatus. For example, an information processing apparatus 1 according to this embodiment is a general multi-functional apparatus (image processing apparatus) that has various functions such as a copy function, a scan function, a fax function and a printing function.

The information processing apparatus 1 is provided with an operation panel 2 for the user to input an operation instruction, a wireless communication unit 3 for performing wireless communication with a portable terminal device 5 in possession of the user, a wireless LAN access point (AP) 6 and the like, and a control unit 4 for integrally controlling the information processing apparatus 1. The wireless communication unit 3 can perform wireless communication by at least two communication standards (a Bluetooth Low Energy standard and an IEEE 802.11 standard). The control unit 4 is connected to the operation panel 2 and the wireless communication unit 3 via an interface, and controls these constituent elements.

The portable terminal device 5 is a terminal in possession of the user, and communication can be performed with the information processing apparatus 1 using this terminal, and various types of processing can be executed using the information processing apparatus 1. The wireless LAN access point 6 serves as a base station when the information processing apparatus 1 performs communication using a wireless LAN, and has a function for interconnection with a wired LAN. A PC 7 is a computer terminal used by the user, and is connected to the wireless LAN access point 6 via the wired LAN.

Hardware Configuration

Figure 3:
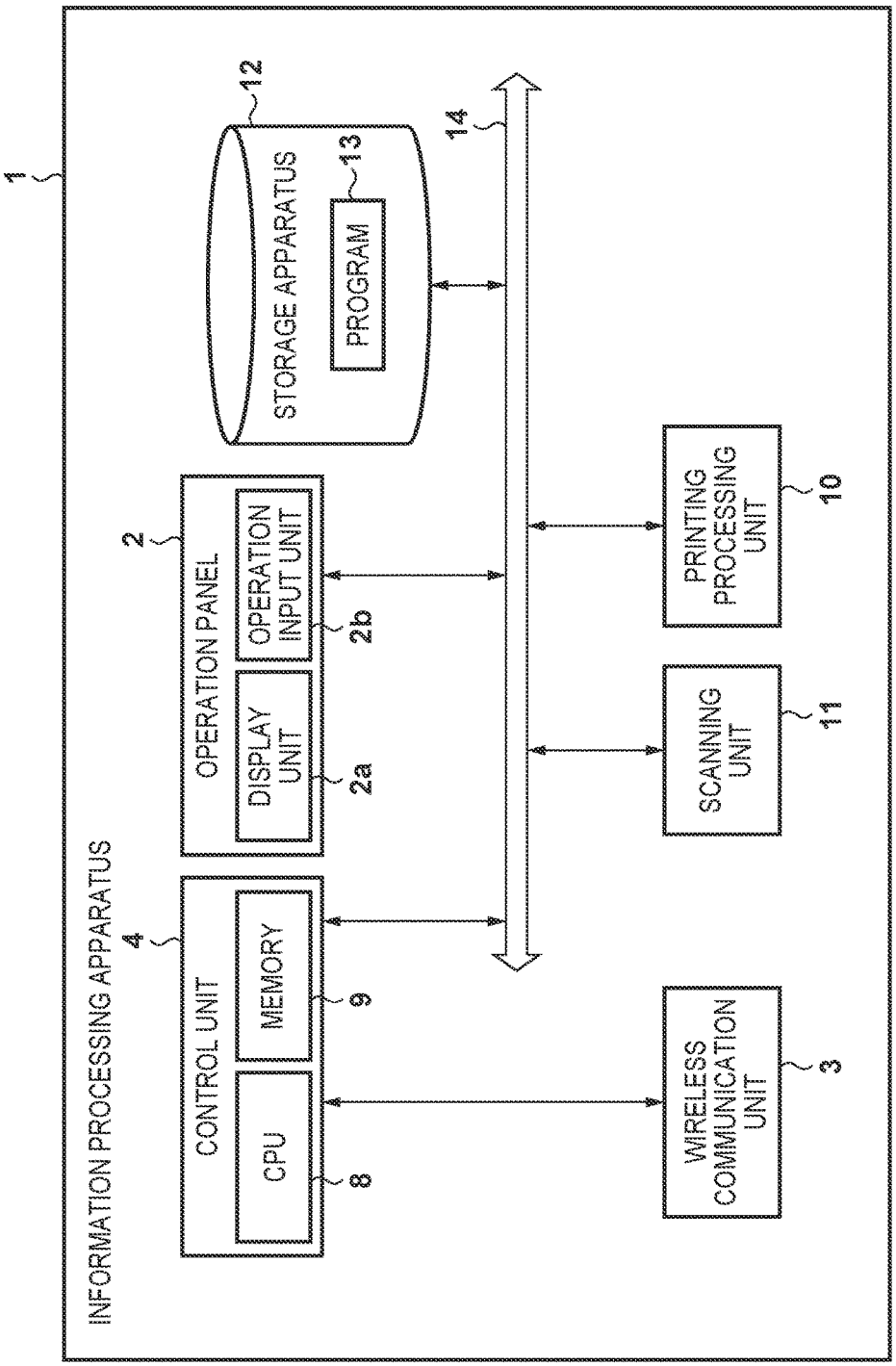
FIG. 3 is a block diagram showing an example of the hardware configuration of the information processing apparatus.

Next, an example of the hardware configuration of the information processing apparatus 1 will be described with reference to FIG. 3. In addition to the operation panel 2, the wireless communication unit 3 and the control unit 4, the information processing apparatus 1 is further provided with a printing processing unit 10, a scanning unit 11 and a storage apparatus 12 as the hardware configuration. The printing processing unit 10 executes printing processing based on image data. The scanning unit 11 scans a document and generates image data. The storage apparatus 12 stores various types of information. These components are configured to be capable of mutual communication by being connected to each other via a bus 14.

In addition, as described above, the wireless communication unit 3 is configured to be communicable with the control unit 4 that controls operations of this information processing apparatus 1 via an interface. Note that a specific example of the interface is USB (Universal Serial Bus).

The control unit 4 is provided with a CPU 8 and a memory 9, and integrally controls operations of constituent elements. The CPU 8 loads a program 13 stored in the storage apparatus 12 to the memory 9, and executes the program 13. The program 13 is a program for causing the control unit 4 to function in order to perform various types of processing, which will be described later. The memory 9 is a work area for storing temporary data that accompanies the execution of a program by the CPU 8, and the like.

As described above, the operation panel 2 has a configuration for the input of an operation instruction by the user. For example, the operation panel 2 is constituted by a liquid crystal panel or the like, and includes a display unit 2a for displaying various types of information and an operation input unit 2b for the input of an operation instruction by the user by detecting an operation performed on the display unit 2a.

Here, a specific display example of an ON (valid)/OFF (invalid) operation of wireless LAN communication and an ON/OFF operation of BLE communication will be described with reference to FIG. 20. A setting screen 2000 shown in FIG. 20 is a screen for performing wireless communication setting. Reference numeral 2001 denotes an ON selection button for wireless LAN communication, reference numeral 2002 denotes an OFF selection button for wireless LAN communication, reference numeral 2003 denotes an ON selection button for BLE communication, and reference numeral 2004 denotes an OFF selection button for BLE communication, and those buttons can be selected by the user touching the respective areas. Note that a white button indicates the selected state. Reference numeral 2005 denotes a cancel button, which makes it possible to make the preceding operations invalid by the user touching the area of the button. Also, reference numeral 2006 denotes an OK button, which makes it possible to confirm the preceding operations by the user touching the area of the button, and to set ON/OFF of wireless LAN communication and BLE communication. The control unit 4 stores, in the storage apparatus 12, setting values corresponding to user operations.

The description will now return to FIG. 3. The wireless communication unit 3 performs processing for communicating with an external device based on a wireless communication standard, and performs data input/output executed between the external device and the control unit 4. The wireless communication unit 3 in this information processing apparatus 1 is assumed to perform communication compatible with the Bluetooth Low Energy (hereinafter, abbreviated as BLE) standard as first wireless communication and communication compatible with a wireless LAN standard as second wireless communication. Of course, the present invention is not limited to this, and other wireless communication may be applied.

The printing processing unit 10 is a processing unit for outputting a printed article by executing printing processing based on image data. For example, the printing processing unit 10 performs printing processing on a recording sheet such as paper fed one sheet at a time, and is provided with an image forming unit that performs image formation based on image data, a transfer unit that transfers a toner image (the image) formed by the image forming unit onto paper, and a fixing unit that fixes the toner image that has been transferred onto the paper. The printing processing unit 10 is also provided with a conveyance unit for discharging a printing article that has been printed, and the like.

The scanning unit 11 is a processing unit that scans a document image and generates image data. For example, the scanning unit 11 is provided with a document conveyance unit for conveying sheets one at a time from the top of documents placed on a document mount, an image data output unit that generates image data by converting a document image that has been scanned, and the like. The storage apparatus 12 stores the aforementioned program 13 and the like.

Wireless Communication Unit

Figure 4:
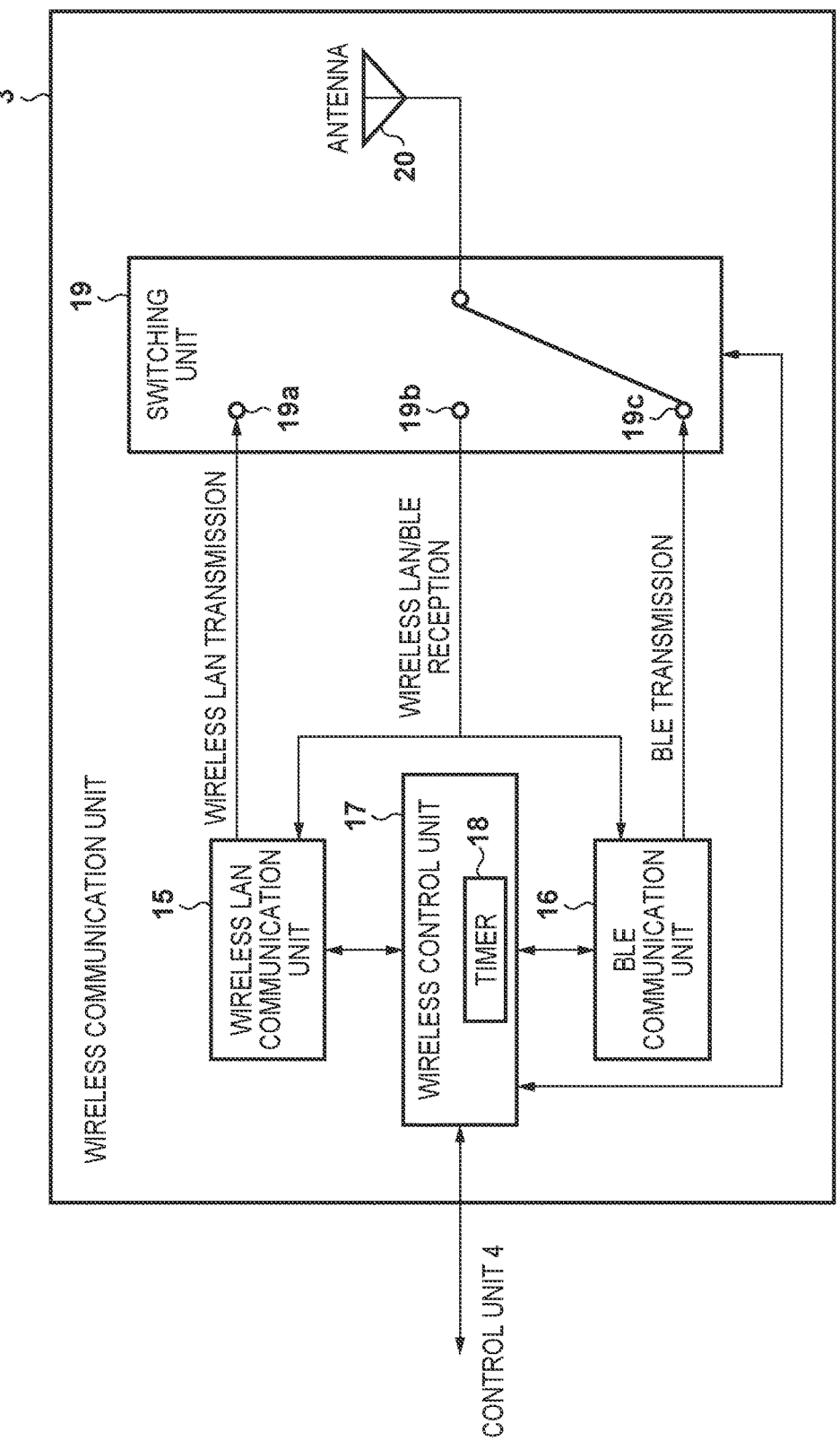
FIG. 4 is a block diagram showing an example of the hardware configuration of a wireless communication unit of the information processing apparatus.

Next, an example of the hardware configuration of the wireless communication unit 3 in the information processing apparatus 1 will be described with reference to FIG. 4. The wireless communication unit 3 is provided with a wireless LAN communication unit 15, a BLE communication unit 16, a wireless control unit 17, a switching unit 19 and an antenna 20. The wireless LAN communication unit 15 functions as a second wireless communication means, and performs processing of wireless LAN communication (second wireless communication) based on a wireless LAN standard, and specifically, performs processing for transmitting and receiving data packets in accordance with a wireless LAN communication procedure. The BLE communication unit 16 functions as a first wireless communication means, and performs processing of BLE communication (first wireless communication) based on the Bluetooth standard, and specifically, performs processing for transmitting BLE beacon packets and processing for transmitting and receiving data packets in accordance with a BLE communication procedure.

The wireless control unit 17 controls processing of communication of the wireless LAN communication unit 15 and the BLE communication unit 16. The wireless control unit 17 can cause these two types of communication to be performed in parallel by sequentially operating the wireless LAN communication unit 15 and the BLE communication unit 16. Hereinafter, execution of wireless communication by two or more different communication standards that is realized by control performed by the wireless control unit 17 is referred to as a "parallel operation". In addition, the wireless control unit 17 is provided with a timer 18, and can time a predetermined time using the timer 18. Furthermore, the wireless control unit 17 is connected to the control unit 4 via the interface, and can exchange, with the control unit 4, various types of data regarding wireless communication performed by the wireless LAN communication unit 15 and the BLE communication unit 16.

The switching unit 19 switches driving of communication processing performed by the wireless LAN communication unit 15 and the BLE communication unit 16. Specifically, the switching unit 19 is a switch that switches between connection of the antenna 20 and a transmission signal and a reception signal of the wireless LAN communication unit 15, and connection of the antenna 20 and a transmission signal and a reception signal of the BLE communication unit 16, and thereby switches between communication paths. Note that the above-described switching between the communication paths performed by the switching unit 19 is controlled by the wireless control unit 17.

The antenna 20 is an antenna for receiving radio waves arriving from an external device and transmitting radio waves to the external device. The antenna 20 transmits a signal received as radio waves to the wireless LAN communication unit 15 or the BLE communication unit 16 via the switching unit 19, and further transmits a signal transmitted from the wireless LAN communication unit 15 or the BLE communication unit 16, as radio waves. In this embodiment, the wireless communication unit 3 is compatible with a wireless LAN standard and the BLE standard, and both the standards use a 2.4 GHz band, and thus as described above, one antenna can be switched and shared.

Portable Terminal Device

Figure 5:
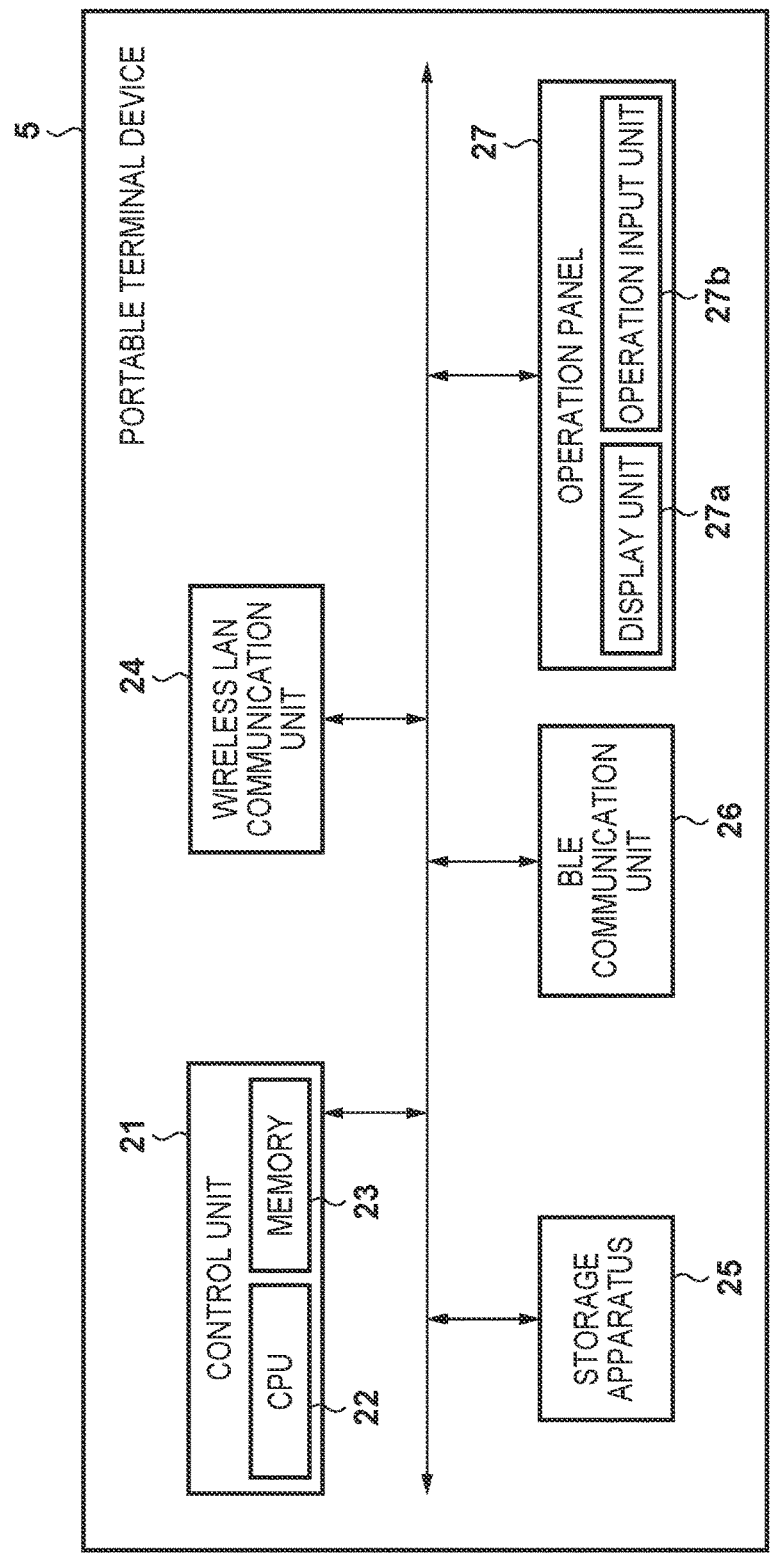
FIG. 5 is a block diagram showing an example of the hardware configuration of a portable terminal device.

Next, an example of the hardware configuration of the portable terminal device 5 will be described with reference to FIG. 5. The portable terminal device 5 is provided with a control unit 21, a wireless LAN communication unit 24, a storage apparatus 25, a BLE communication unit 26 and an operation panel 27.

The control unit 21 integrally controls the portable terminal device 5, and is constituted by a CPU 22 and a memory 23. The CPU 22 loads various programs stored in the storage apparatus 25 to the memory 23, and executes the programs. The memory 23 stores temporary data that accompanies the execution of a program by the CPU 22, and the like.

The wireless LAN communication unit 24 performs processing for communicating with an external device based on a wireless LAN standard, and performs data input/output processing performed between the external device and the control unit 21. In addition, the BLE communication unit 26 performs BLE communication processing with the external device based on the Bluetooth standard, and performs data input/output processing performed between the external device and the control unit 21.

The operation panel 27 has a configuration for allowing the user to input an instruction. Accordingly, the operation panel 27 is constituted by a display unit 27*a* that is constituted by a liquid crystal panel and displays various types of information, and an operation input unit 27*b* for the input of an operation instruction by the user by detecting an operation on the display unit 27*a*. In addition, the portable terminal device 5 is provided with constituent elements of a power supply necessary to a portable terminal device, such as a battery and a power supply control unit, although not illustrated.

Switch Control

Next, switch control performed by the switching unit 19 in the wireless communication unit 3 shown in FIG. 4 will be described in detail. As described above, the wireless communication unit 3 is constituted by the wireless LAN communication unit 15 and the BLE communication unit 16, which are respectively capable of wireless LAN communication that is based on a wireless LAN standard (the second wireless communication) and BLE communication that is based on the Bluetooth standard (the first wireless communication). Note that one IC in which a plurality of different functions are implemented in this manner will be referred to as a combo chip. In this embodiment, a combo chip for wireless LAN communication and BLE communication is used. In addition, the wireless frequencies of wireless LAN communication and BLE communication of the combo chip are the same, namely, the 2.4 GHz band, thus providing a feature in that one antenna can be switched and used.

Meanwhile, the antenna 20 is shared by wireless LAN communication and BLE communication, and thus it is necessary for the switching unit 19 to perform communication while switching the communication path according to the respective communication states. Therefore, there is a priority order in switching of the communication path according to the communication state. As shown in FIG. 4, the switching unit 19 is constituted by a switch including contact points 19*a*, 19*b* and 19*c* for switching and a shared contact point, and the shared contact point is connected to the antenna 20.

On the other hand, the contact point 19*a* is connected to a wireless LAN transmission signal transmitted from the wireless LAN communication unit 15. The contact point 19*b* is connected in parallel to a wireless LAN reception signal that is sent to the wireless LAN communication unit 15 and a BLE reception signal that is sent to the BLE communication unit 16. The contact point 19*c* is connected to a BLE transmission signal transmitted from the BLE communication unit 16. Note that this BLE transmission signal is assumed to include the state of transmission of BLE beacon packets and the state of transmission of data packets in BLE data communication, which are defined in the Bluetooth standard.

FIG. 6 shows the priority order of communication path switch control in the switching unit 19. First, the BLE packet transmission state of the BLE communication unit 16 is a first-order priority, and the switching contact point of the switching unit 19 at this time is set to 19*c*. Next, the BLE packet reception state of the BLE communication unit 16 is a second-order priority, and the switching contact point of the switching unit 19 is set to 19*b*. Next, the wireless LAN packet transmission state of the wireless LAN communication unit 15 is a third-order priority, and the switching contact point of the switching unit 19 is set to 19*a*. Next, the wireless LAN packet reception state of the wireless LAN communication unit 15 is a fourth-order priority, and the switching contact point of the switching unit 19 is set to 19*b*. In an idle state in which no wireless communication is performed, the switching contact point of the switching unit 19 is set to 19*b*. Note that communication in the wireless LAN communication unit 15 and the BLE communication unit 16 and the switching of the switching unit 19 that have been described above and are based on the priority order of the communication state are assumed to be controlled by the wireless control unit 17.

Flow of Bluetooth Communication

Next, a flow of Bluetooth communication performed between the information processing apparatus 1 and the portable terminal device 5 will be described with reference to FIG. 7. Note that this communication flow is based on the flow of BLE communication stipulated in the Bluetooth standard. Here, the information processing apparatus 1 causes the above-described wireless control unit 17 to control the BLE communication unit 16 and the switching unit 19 so as to perform BLE communication.

First, the wireless control unit 17 controls the BLE communication unit 16 and the switching unit 19 at a certain interval instructed by the control unit 4 so as to transmit beacon packets 701 to 705 directed to an unspecified large number of apparatuses. Note that, in this embodiment, the time interval at which these beacon packets are transmitted is assumed to be Tbeacon. In addition, in this embodiment, a beacon packet transmitted by the information processing apparatus 1 includes attribute information for specifying the apparatus, such as the model name of the information processing apparatus 1.

In the portable terminal device 5, when a program in the storage apparatus 25 is started by a user operation, and a request for BLE communication is generated, the CPU 22 in the control unit 21 instructs the BLE communication unit 26 to start communication. The BLE communication unit 26 searches for a beacon packet regarding a connection target, and when a beacon packet regarding a connection target is found, transmits a request packet 706 indicating a BLE communication request. Upon receiving this request packet 706 using the BLE communication unit 16, the information processing apparatus 1 transitions to reception of packets 707 and 709 from the portable terminal device 5. At the same time, the information processing apparatus 1 controls the BLE communication unit 16 so as to cancel transmission of beacon packets.

After this, the portable terminal device 5 transmits the first data packet 707 in accordance with the communication standard. Subsequently, upon receiving a first response packet 708 for the first data packet 707, data in the packet is extracted, and is output to the CPU 22 of the control unit 21. If further data communication is necessary, the CPU 22 of the control unit 21 outputs transmission data to the BLE communication unit 26, and instructs data transfer. The BLE communication unit 26 that received the instruction transmits the second data packet 709, and receives a second response packet 710 for this. Data transfer from the portable terminal device 5 to the information processing apparatus 1 is performed by repeating the above processing. If no further data transfer is to be performed, BLE communication is disconnected, and the operation ends.

In this embodiment, an operation of controlling the time interval of BLE beacon packets when BLE communication and wireless LAN communication are performed at the same time will be described below in detail with reference to flowcharts and drawings based on the above description.

Processing Procedure

Setting of Beacon Transmission Interval

Figure 8:
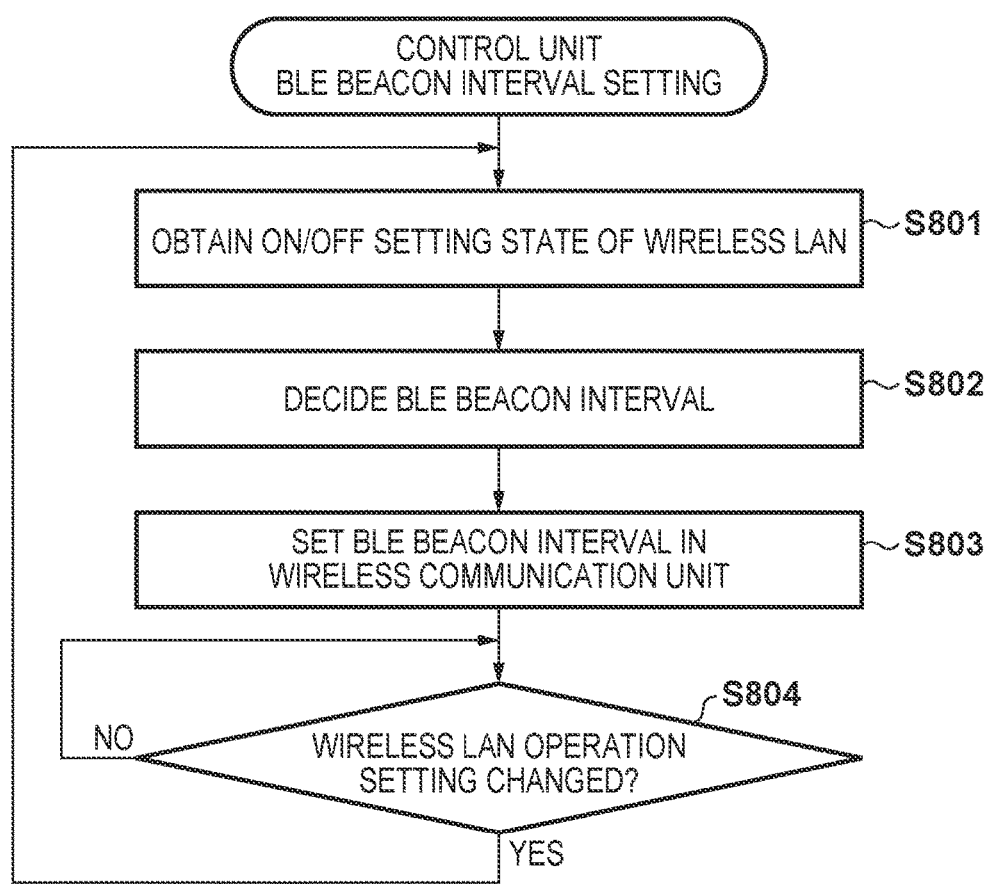
FIG. 8 is a flowchart of an operation in which a control unit of the information processing apparatus sets a BLE beacon interval.

First, an operation of setting the time interval of BLE beacon transmission in the wireless communication unit 3, which is performed by the control unit 4 of the information processing apparatus 1, will be described with reference to FIG. 8. The processing described below is realized by the CPU 8 of the information processing apparatus 1 loading the program 13 stored in the storage apparatus 12 to the memory 9, and executing the program 13, for example.

In step S801, when the information processing apparatus 1 is started, the control unit 4 obtains an ON/OFF setting value (setting state) of wireless LAN communication stored in the storage apparatus 12. Subsequently, in step S802, the control unit 4 decides the BLE beacon interval based on the ON/OFF setting value of wireless LAN communication obtained in step S801. Specifically, the control unit 4 determines, from the ON/OFF setting value (setting state) of wireless LAN communication stored in the storage apparatus 12 and obtained in step S801, whether or not wireless LAN communication is set to ON. Furthermore, the control unit 4 refers to table data in which the determination results and BLE beacon intervals are associated with each other, and decides the BLE beacon interval.

FIG. 16 shows an example of the table data. As shown in FIG. 16, if wireless LAN communication is OFF, the BLE beacon interval is 30 mS (a first transmission interval), and if wireless LAN is ON, the BLE beacon interval is 100 mS (a second transmission interval).

The description will now return to FIG. 8. Next, in step S803, the control unit 4 transmits the setting value of the BLE beacon interval decided in step S802 to the wireless communication unit 3, and performs setting on the wireless communication unit 3. Subsequently, in step S804, the control unit 4 determines whether or not the ON/OFF setting of wireless LAN communication has been changed by a user operation on the operation panel 2. Specifically, it is determined whether or not, in the setting screen 2000 in FIG. 20, the OK button 2006 has been touched after the area of the unselected one of the ON button 2001 and the OFF button 2002 for wireless LAN communication was touched. If it is determined that the ON/OFF setting of wireless LAN communication has been changed (if YES), the procedure returns to step S801, and otherwise (if NO), the determination in step S804 is repeated. The setting screen 2000 makes it possible to set ON/OFF of wireless LAN communication and BLE communication according to user input in this manner.

Timer Setting

Next, a processing procedure in which the wireless communication unit 3 of the information processing apparatus 1 receives the setting value of the BLE beacon interval from the control unit 4, and sets the beacon interval in the timer will be described with reference to FIG. 9. The processing described below is realized by the CPU 8 of the information processing apparatus 1 loading the program 13 stored in the storage apparatus 12 to the memory 9, and executing the program 13, for example.

In step S901, the wireless control unit 17 of the wireless communication unit 3 determines whether or not the setting value of the BLE beacon interval has been received from the control unit 4. If the setting value of the BLE beacon interval has been received (if YES), the wireless control unit 17 advances the procedure to step S902, and if the setting value of the BLE beacon interval has not been received (if NO), returns the procedure to step S901.

In step S902, the wireless control unit 17 sets, in the timer 18, the setting value of the BLE beacon interval received from the control unit 4. Subsequently, in step S903, the wireless control unit 17 starts the timer 18 based on the setting value of the BLE beacon interval set in the timer 18 in step S902. As described above, every time a setting value of a BLE beacon interval is received from the control unit 4, the wireless control unit 17 sets the timer 18. After this, the operation ends.

Beacon Packet Transmission

Next, a processing procedure for transmitting BLE beacon packets under control of the wireless control unit 17 of the information processing apparatus 1 will be described with reference to FIG. 10. The processing described below is realized by the CPU 8 of the information processing apparatus 1 loading the program 13 stored in the storage apparatus 12 to the memory 9, and executing the program 13, for example.

In step S1001, the wireless control unit 17 determines whether or not timer interruption by the timer 18 has occurred. Here, occurrence of timer interruption indicates that the BLE beacon interval time that is set in the timer 18 in accordance with the flowchart in FIG. 9 has elapsed. If it is determined that timer interruption has occurred (if YES), the wireless control unit 17 advances the procedure to step S1002, and if it is determined that timer interruption has not occurred (if NO), returns the procedure to step S1001.

In step S1002, the wireless control unit 17 sets the switching contact point of the switching unit 19 to 19c. Subsequently, in step S1003, the wireless control unit 17 controls the BLE communication unit 16 so as to transmit BLE beacon packets. In step S1004, the wireless control unit 17 sets the switching contact point of the switching unit 19 to 19b. This is processing for receiving a request packet or a data packet in response to the beacon packets transmitted in step S1003. After this, the procedure returns to step S1001.

Therefore, steps S1001 to S1004 are looped, and thereby timer interruption of the timer 18 occurs at a certain interval in accordance with the setting of the BLE beacon interval, and transmission of BLE beacon packets will be performed periodically and repeatedly. Accordingly, packets can be transmitted at the BLE beacon interval set in step S902.

BLE Data Packet Reception

Next, a processing procedure for receiving BLE data packets under control of the wireless control unit 17 of the information processing apparatus 1 will be described with reference to FIG. 11. The processing described below is realized by the CPU 8 of the information processing apparatus 1 loading the program 13 stored in the storage apparatus 12 to the memory 9, and executing the program 13, for example.

In step S1101, the wireless control unit 17 sets the switching contact point of the switching unit 19 to 19b. Note that this processing may be skipped if the switching contact point has been set to 19b in the above step S1004. In step S1102, the wireless control unit 17 controls the BLE communication unit 16 so as to determine whether or not a request packet for BLE communication directed to the information processing apparatus 1 has been received from an external device. If it is determined that a request packet for BLE communication has been received (if YES), the wireless control unit 17 advances the procedure to step S1103, and if it is determined that a request packet for BLE communication has not been received (if NO), repeats the determination in step S1102.

In step S1103, the wireless control unit 17 cancels transmission of BLE beacon packets. Specifically, the wireless control unit 17 controls the BLE communication unit 16 so as to cancel the operation of transmitting BLE beacon packets shown in the flowchart in FIG. 10. In step S1104, the wireless control unit 17 controls the BLE communication unit 16 so as to determine whether or not a data packet directed to the information processing apparatus 1 has been received from the external device. If it is determined that a BLE data packet has been received (if YES), the wireless control unit 17 advances the procedure to step S1105, and if it is determined that a BLE data packet has not been received (if NO), repeats the determination in step S1104.

In step S1105, the wireless control unit 17 analyzes the data packet received by controlling the BLE communication unit 16. Specifically, the wireless control unit 17 performs CRC (Cyclic Redundancy Check) or the like on the received data packet based on the Bluetooth communication standard, and analyzes the received packet to check whether or not the data of the received packet has an error.

Next, in step S1106, the wireless control unit 17 determines, based on the analysis result of the received packet in step S1105, whether or not the received packet is normal. If it is determined that the received data packet is normal (if YES), the wireless control unit 17 advances the procedure to step S1107, and if it is determined that the received data packet is not normal (if NO), returns the procedure to step S1104.

In step S1107, the wireless control unit 17 sets the switching contact point of the switching unit 19 to 19c. Subsequently, in step S1108, the wireless control unit 17 controls the BLE communication unit 16 so as to transmit a BLE response packet. In step S1109, the wireless control unit 17 sets the switching contact point of the switching unit 19 to 19b. After that, in step S1110, the wireless control unit 17 controls the BLE communication unit 16 so as to receive all the BLE data packets, and determines whether or not to end reception of data packets. Specifically, if it is determined that all the expected packets have been received based on the communication control of the Bluetooth communication standard, and data communication is complete (if YES), the wireless control unit 17 advances the procedure to step S1111. On the other hand, if it is determined that all the expected packets have not been received, and data communication is not complete (if NO), the wireless control unit 17 returns the procedure to step S1104, and repeats reception of data packets.

In step S1111, the wireless control unit 17 controls the BLE communication unit 16 so as to transfer the data received by BLE communication to the control unit 4. Specifically, the wireless control unit 17 controls the BLE communication unit 16 so as to extract user data from payload portions of the BLE received packets that were received in steps S1104 to S1110, and transfers the user data collectively to the control unit 4 as received data. After this, the operation ends.

Wireless LAN Data Packet Transmission

Next, a processing procedure for transmitting a wireless LAN data packet under control of the wireless control unit 17 of the information processing apparatus 1 will be described with reference to FIG. 12. The processing described below is realized by the CPU 8 of the information processing apparatus 1 loading the program 13 stored in the storage apparatus 12 to the memory 9, and executing the program 13, for example.

In step S1201, the wireless control unit 17 receives transmission data from the control unit 4. Specifically, in the information processing apparatus 1, if the control unit 4 determines that wireless LAN data transmission is necessary, wireless LAN transmission data generated by the control unit 4 is transferred from the control unit 4 to the wireless control unit 17, and is received by the wireless control unit 17.

In step S1202, the wireless control unit 17 converts the received transmission data that was transferred from the control unit 4 into a predetermined form of a transmission packet based on the wireless LAN communication standard, and generates a transmission packet to be transmitted to the outside. In step S1203, the wireless control unit 17 sets the switching contact point of the switching unit 19 to 19a. In step S1204, the wireless control unit 17 controls the wireless LAN communication unit 15 so as to transmit the wireless LAN data packet generated in step S1202 to the external apparatus that is a communication partner.

Next, in step S1205, the wireless control unit 17 sets the switching contact point of the switching unit 19 to 19b. In step S1206, the wireless control unit 17 controls the wireless LAN communication unit 15 so as to determine whether or not an ACK packet has been received from the external apparatus that is a communication partner, based on the communication control of the wireless LAN communication standard. If it is determined that an ACK packet has been received (if YES), the wireless control unit 17 advances the procedure to step S1207, and if it is determined that an ACK packet has not been received (if NO), advances the procedure to step S1208.

In step S1208, the wireless control unit 17 determines that the data packet transmitted in step S1204 has not been normally received by the external apparatus that is a communication partner, and controls the wireless LAN communication unit 15 so as to resend the wireless LAN data packet transmitted in step S1204. After that, the procedure advances to step S1206 again, where the wireless control unit 17 determines whether or not an ACK packet has been received. Accordingly, if it is determined in step S1206 that an ACK packet could not be received, the procedure transitions to step S1208, where the data packet is resent, and this processing is repeated until an ACK packet is normally received from the external apparatus that is a communication partner.

In step S1207, the wireless LAN communication unit 15 determines whether or not transmission of all the data packets is complete. Accordingly, if it is determined that all the expected ACK packets have been transmitted based on the communication control of the communication standard of wireless LAN, and that data communication is complete (if YES), the processing ends. On the other hand, if it is determined that all the expected ACK packets have not been received, and that data communication is not complete (if NO), the procedure returns to step S1202, where transmission of data packets is repeated.

Wireless LAN Data Packet Reception

Figure 13:
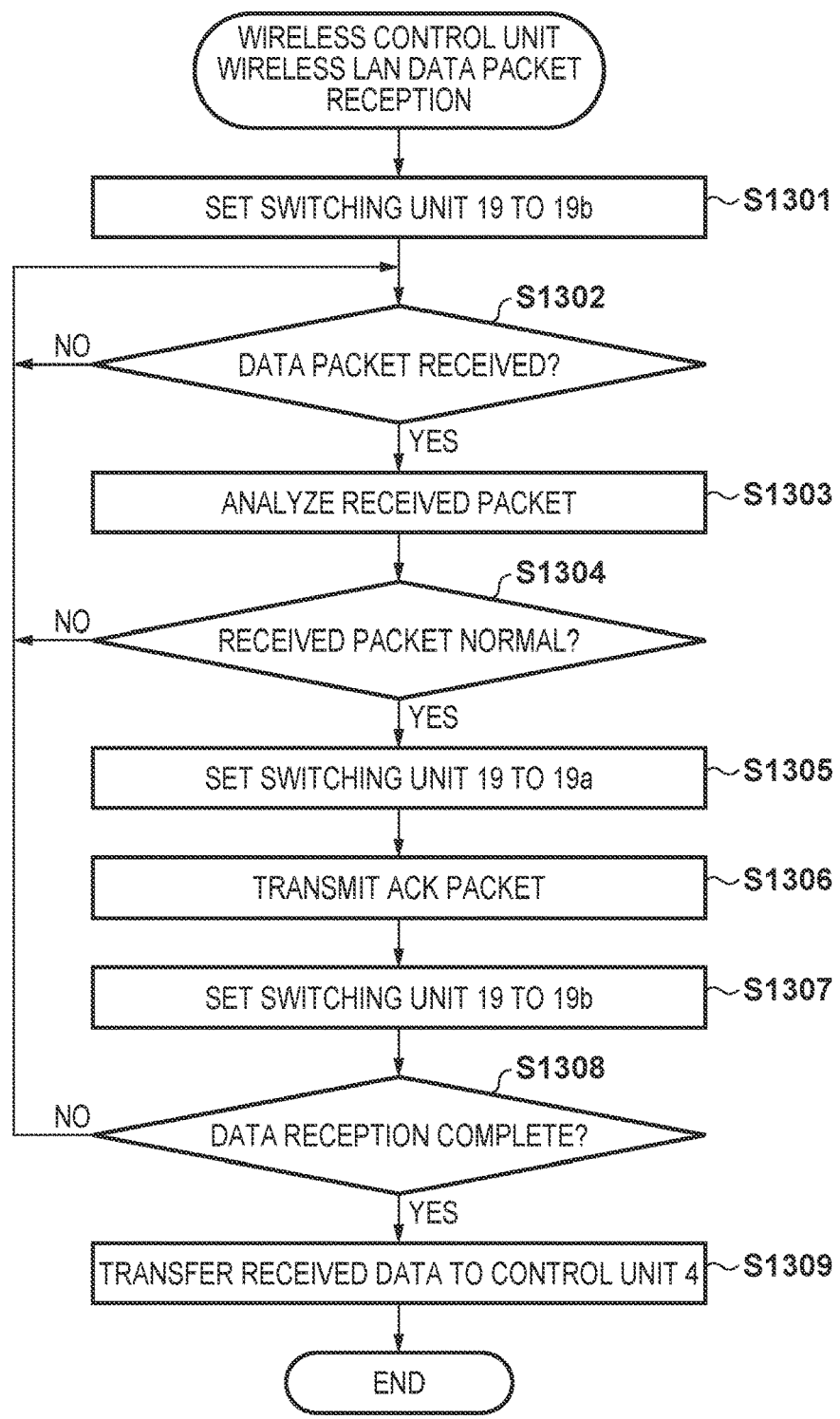
FIG. 13 is a flowchart of an operation in which the wireless control unit of the information processing apparatus receives a wireless LAN data packet.

Next, a processing procedure for receiving a wireless LAN data packet under control of the wireless control unit 17 of the information processing apparatus 1 will be described with reference to FIG. 13. The processing described below is realized by the CPU 8 of the information processing apparatus 1 loading the program 13 stored in the storage apparatus 12 to the memory 9, and executing the program 13, for example.

In step S1301, the wireless control unit 17 sets the switching contact point of the switching unit 19 to 19b. Subsequently, in step S1302, the wireless control unit 17 controls the wireless LAN communication unit 15 so as to determine whether or not a data packet directed to the information processing apparatus 1 has been received from the external device. If it is determined that a wireless LAN data packet has been received (if YES), the wireless control unit 17 advances the procedure to step S1303, and if it is determined that a wireless LAN data packet has not been received (if NO), repeats the determination in step S1302.

In step S1303, the wireless control unit 17 controls the wireless LAN communication unit 15 so as to analyze the received data packet. Specifically, the wireless control unit 17 performs frame check or the like on the received data packet based on the communication standard of wireless LAN, and analyzes the received packet to check whether or not the data of the received packet has an error. Subsequently, in step S1304, the wireless control unit 17 determines whether or not the received packet is normal, based on the analysis result of the received packet in step S1303. If it is determined that the received data packet is normal (if YES), the wireless control unit 17 advances the procedure to step S1305, and if it is determined that the received data packet is not normal (if NO), returns the procedure to step S1302.

In step S1305, the wireless control unit 17 sets the switching contact point of the switching unit 19 to 19a. Subsequently, in step S1306, the wireless control unit 17 controls the wireless LAN communication unit 15 so as to transmit an ACK packet that is compatible with the communication control of the wireless LAN communication standard. In step S1307, the wireless control unit 17 sets the switching contact point of the switching unit 19 to 19b.

In step S1308, the wireless control unit 17 controls the wireless LAN communication unit 15 so as to determine whether or not all the wireless LAN data packets have been received, and reception of data packets is complete. Specifically, if it is determined that all the expected packets have been received based on the communication control of the communication standard of the wireless LAN, and that data communication is complete (if YES), the wireless control unit 17 advances the procedure to step S1309. On the other hand, if it is determined that all the expected packets have not been received, and that data communication is not complete (if NO), the wireless control unit 17 returns the procedure to step S1302, and repeats reception of data packets.

In step S1309, the wireless control unit 17 controls the wireless LAN communication unit 15 so as to transfer data received using the wireless LAN to the control unit 4. Specifically, the wireless control unit 17 controls the wireless LAN communication unit 15 so as to extract user data from payload portions of the received packets of wireless LAN received in steps S1302 to S1308, and transfer the user data collectively to the control unit 4 as received data. After this, the operation ends.

BLE Data Packet Transmission (Portable Terminal Device)

Figure 14:
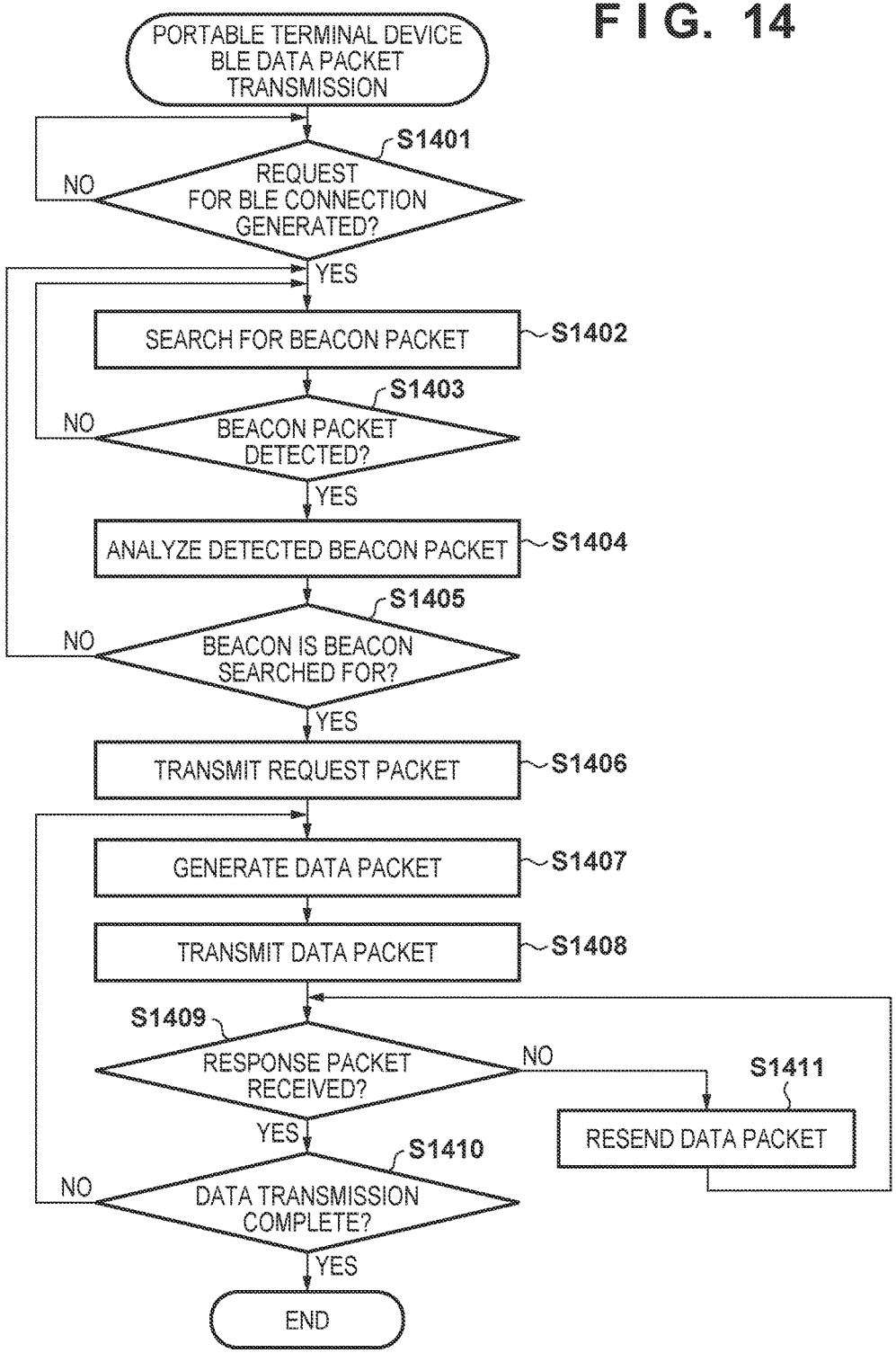
FIG. 14 is a flowchart of an operation in which, in the portable terminal device, a request for wireless communication is generated, and a data packet is transmitted.

Next, a processing procedure for transmitting a data packet after a request for wireless communication by BLE is generated in the portable terminal device 5 will be described with reference to FIG. 14. The processing described below is realized by the CPU 22 of the portable terminal device 5 loading a program stored in the storage apparatus 25 to the memory 23, and executing the program, for example.

In step S1401, the CPU 22 determines whether or not a request for communication connection has been generated in application software that operates on the portable terminal device 5 and that uses BLE. If a connection request has been made (if YES), the CPU 22 advances the procedure to step S1402, and if a connection request has not been made (if NO), repeats the determination in step S1401 until a connection request is generated.

In step S1402, the CPU 22 causes the BLE communication unit 26 to search for a beacon packet. In step S1403, the CPU 22 determines whether or not a beacon packet could be detected, and if a beacon packet could not be detected (if NO), returns the procedure to 1402, and if a beacon packet was detected (if YES), advances the procedure to step S1404.

In step S1404, the CPU 22 extracts the data in the detected beacon packet, and analyzes the data. Note that as described above, this beacon packet includes attribute information for identifying the apparatus such as the model name of the information processing apparatus 1. Subsequently, in step S1405, the CPU 22 reads out the attribute information such as the model name of the information processing apparatus 1 included in the data of the beacon packet, and determines whether or not the apparatus is the information processing apparatus 1 that has been searched for. If the apparatus is not the information processing apparatus 1 that has been searched for (if NO), the CPU 22 returns the procedure to step S1402, and if the apparatus is the information processing apparatus 1 that has been searched for (if YES), advances the procedure to step S1406.

In step S1406, the CPU 22 causes the BLE communication unit 26 to generate a request packet, and transmit the request packet to the information processing apparatus 1 that is a communication partner. Subsequently, in step S1407, the CPU 22 causes the BLE communication unit 26 to generate a data packet directed to the information processing apparatus 1 that is a communication partner. In step S1408, the CPU 22 causes the BLE communication unit 26 to transmit the data packet directed to the information processing apparatus 1 that is a communication partner.

Next, in step S1409, the CPU 22 determines whether or not a response packet in response to data packet transmission performed in step S1408 by the BLE communication unit 26 has been received from the information processing apparatus 1. If it is determined that a response packet could not be received (if NO), the CPU 22 advances the procedure to step S1411. In step S1411, the CPU 22 determines that the data packet transmitted in step S1409 has not been normally received by the information processing apparatus 1, resends the data packet transmitted in step S1409, and returns the procedure to step S1409. After that, the CPU 22 determines whether or not a response packet in response to data packet transmission in step S1408 has been received from the information processing apparatus 1 by the BLE communication unit 26. Specifically, if it is determined in step S1409 that a response packet from the information processing apparatus 1 could not be received, the procedure transitions to step S1411, where the data packet is resent, and this processing is repeated until a response packet is received.

On the other hand, if it is determined in step S1410 that a response packet has been received (if YES), the CPU 22 advances the procedure to step S1410. In step S1410, the CPU 22 determines whether or not all the data packets have been transmitted, and data transmission is complete. If it is determined that transmission of all the data packets is complete (if YES), the CPU 22 ends data transmission of BLE, and if it is determined that data transmission is not complete (if NO), returns the procedure to step S1407, and repeats transmission of data packets.

Parallel Operation

Next, a parallel operation of wireless LAN communication (the second wireless communication) and BLE communication (the first wireless communication) in the information processing apparatus 1 will be described with reference to FIGS. 15A, 15B, 15C, 17A, 17B, 18A and 18B. In this embodiment, it is assumed that the information processing apparatus 1 performs BLE communication with the portable terminal device 5, and receives BLE data. It is also assumed that the information processing apparatus 1 performs wireless LAN communication via the wireless LAN access point 6 in order to perform transmission/reception of data with the PC 7 connected to the wireless LAN access point 6. At this time, in the information processing apparatus 1, a parallel operation of BLE communication and wireless LAN communication occurs.

Figure 7:
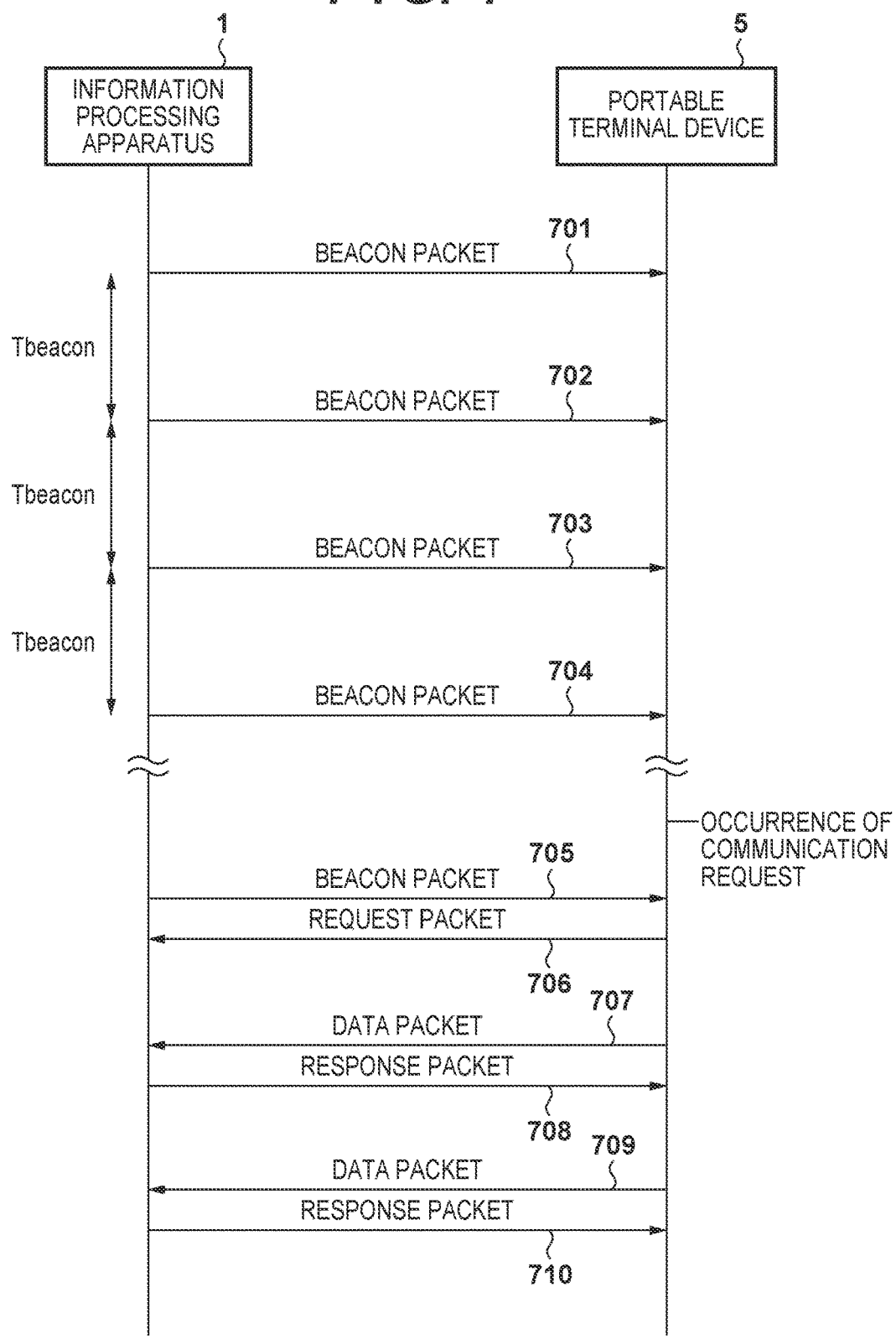
FIG. 7 is a diagram showing a communication flow between the information processing apparatus and the portable terminal device.

First, the information processing apparatus 1 performs BLE communication with the portable terminal device 5 in accordance with the flow shown in FIG. 7. Here, the information processing apparatus 1 transmits BLE beacon packets at a certain interval of Tbeacon based on the flowchart in FIG. 10. The portable terminal device 5 transmits BLE data packets in response to this based on the flowchart in FIG. 12.

Subsequently, in the information processing apparatus 1, the BLE data packets are received based on the flowchart in FIG. 11. On the other hand, the information processing apparatus 1 transmits wireless LAN data in packets to the wireless LAN access point 6 based on the flowchart in FIG. 12, and transmits the data to the PC 7. Also, the information processing apparatus 1 receives wireless LAN data in packets from the wireless LAN access point 6 based on the flowchart in FIG. 13, and receives the data from the PC 7.

Figure 15A:
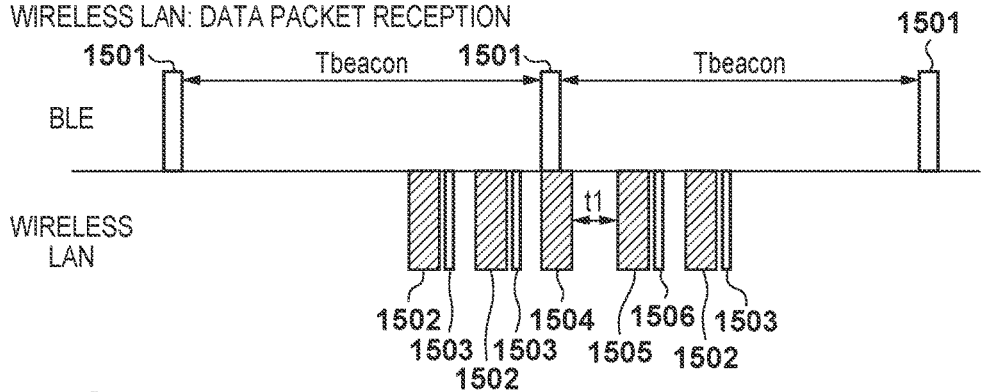
FIGS. 15A to 15C are diagrams illustrating a parallel operation of BLE and a wireless LAN.
Figure 15B:
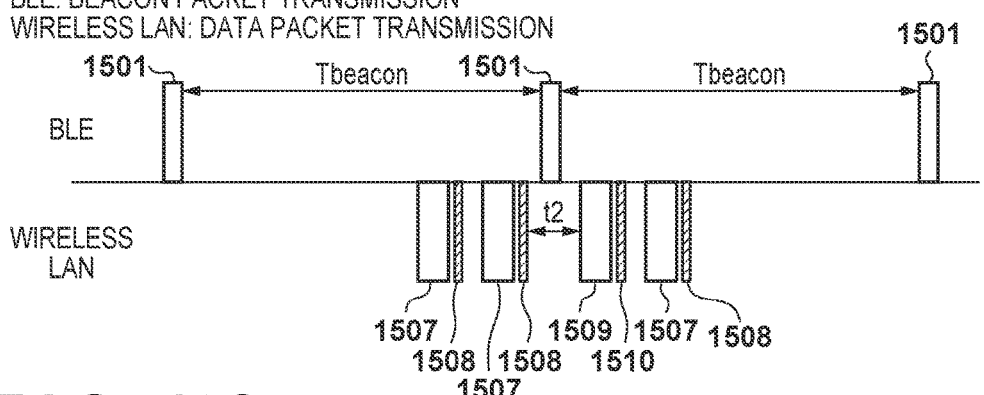
Figure 15C:
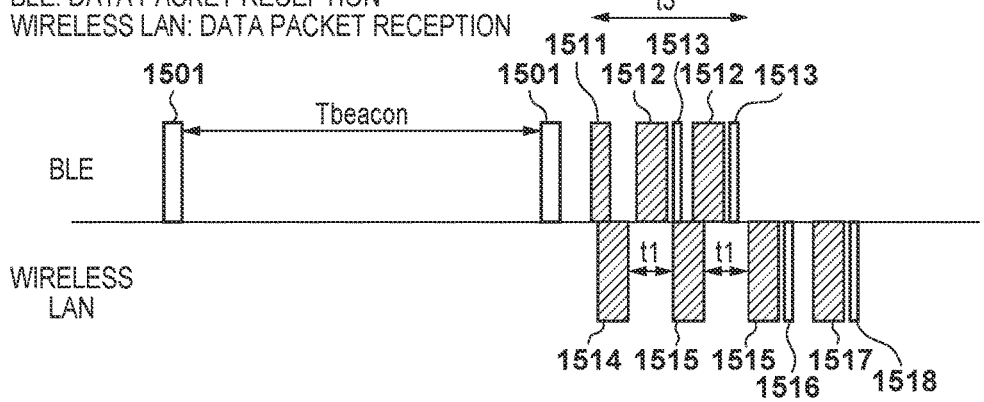

FIGS. 15A to 15C are diagrams illustrating a parallel operation of BLE communication and wireless LAN communication in the information processing apparatus 1 at the level of packets. The examples in FIGS. 15A to 15C show a state where the transmission interval of beacon packets by BLE communication is fixed. In FIGS. 15A to 15C, a packet indicated by a white rectangle represents a transmission packet in the information processing apparatus 1. Also, a packet indicated by a shaded rectangle represents a received packet in the information processing apparatus 1. The horizontal axis indicates the elapse of time.

FIG. 15A shows a parallel operation in the information processing apparatus 1 between beacon packet transmission in BLE communication and data packet reception in wireless LAN communication.

Figure 10:
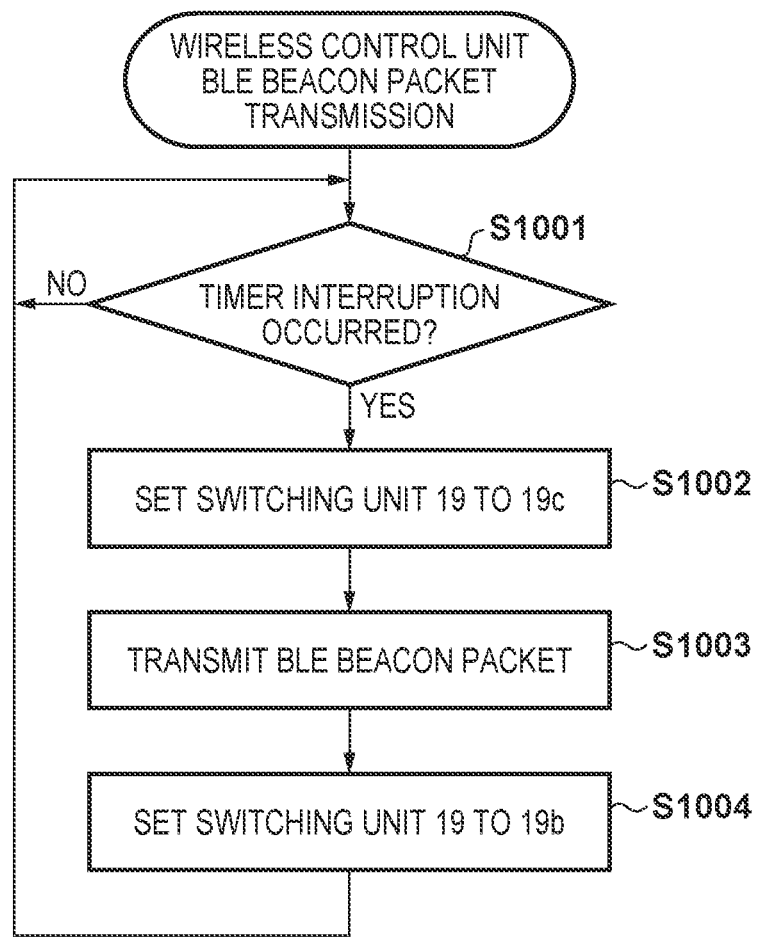
FIG. 10 is a flowchart of an operation in which the wireless control unit of the information processing apparatus transmits a BLE beacon packet.

A packet 1501 represents a beacon packet transmitted in BLE communication, and this is transmitted at a certain interval denoted by Tbeacon in accordance with the flowchart in FIG. 10. A packet 1502 represents a data packet received in wireless LAN communication, and this is received in accordance with the flowchart in FIG. 13. If it is determined in step S1304 that the packet 1502 is a normal packet, the information processing apparatus 1 transmits an ACK packet in step S1306. This is indicated by a packet 1503. In this manner, if the packet 1502 that is a data packet is normally received, the packet 1503 that is an ACK packet and that is for the packet 1502 is transmitted.

Here, assume that a packet 1504 that is a data received packet in wireless LAN communication was received at a timing at which the packet 1501 that is a beacon transmission packet in BLE communication was transmitted. However, BLE transmission is prioritized since BLE transmission has the highest priority order as shown in FIG. 6, the switching unit 19 is set to 19c in step S1002 in accordance with the flowchart in FIG. 10, and BLE beacon packets are transmitted in step S1003. After this, in step S1004, the switching unit 19 is set to 19b.

At this time, while the switching unit 19 is set to 19c, the received packet 1504 does not properly reach the wireless LAN communication unit 15, and thus it is determined in step S1304 that the received packet is not normal. Therefore, an ACK packet is not transmitted, and the procedure returns to step S1302 again, in which data packets are received.

On the other hand, in the wireless LAN access point 6 that is a communication partner of the wireless LAN, an ACK packet for the packet 1504 that is the transmitted data packet is not received, and thus the packet 1504 is resent in accordance with the communication control of the wireless LAN communication standard. This resent packet of the packet 1504 is indicated by a packet 1505. Note that, according to the communication control of the wireless LAN communication standard, if a data packet is resent due to an ACK packet not being detected, the data packet needs to be resent after a certain time (t1 in the drawing) has elapsed. The resent packet 1505 normally reaches the wireless LAN communication unit 15, and thus when it is determined in step S1304 that the packet is a normal packet, the information processing apparatus 1 transmits an ACK packet in step S1306. This is indicated by the packet 1506.

After that, if the packet 1502 that is a data packet is received normally, the packet 1503 that is an ACK packet in response to this packet is transmitted again. In this manner, if a wireless LAN data packet is received during BLE beacon packet transmission, the wireless LAN data packet is not received normally, and thus the data packet is resent. As is clear, due to this reception of the resent packet and a standby time (t1 in the drawing) for this reception, a decrease in the throughput of reception of the wireless LAN data packet will occur.

FIG. 15B shows a parallel operation in the information processing apparatus 1 between beacon packet transmission by BLE communication and data packet transmission by wireless LAN communication. As described above, the packet 1501 indicates a beacon packet transmitted in BLE communication, and this is transmitted at a certain interval denoted by Tbeacon in accordance with the flowchart in FIG. 10.

Figure 12:
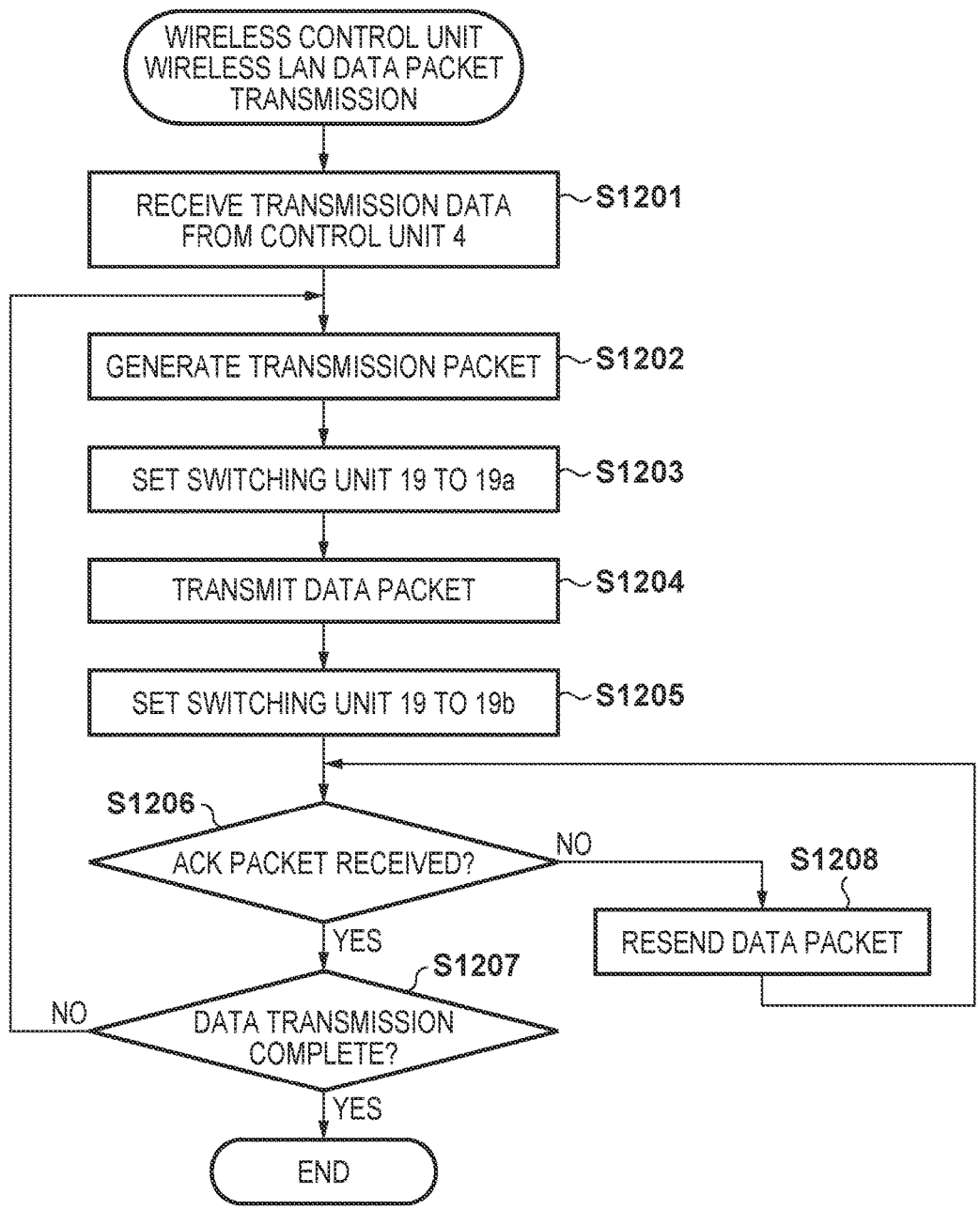
FIG. 12 is a flowchart of an operation in which the wireless control unit of the information processing apparatus transmits a wireless LAN data packet.

A packet 1507 indicates a data packet transmitted in wireless LAN communication, and this is transmitted in accordance with the flowchart in FIG. 12. After the packet 1507 is transmitted in step S1204, an ACK packet is received from the wireless LAN access point 6 that is a communication partner. The determination in step S1206 that an ACK packet has been received indicates that transmission of the packet 1507 was performed normally. This ACK packet is indicated by a packet 1508. In this manner, if the packet 1507 that is a data packet is transmitted normally, the packet 1508 that is an ACK packet in response to this packet is received.

Here, assume that the timing at which a wireless LAN data packet is transmitted has approached the timing at which a BLE beacon is transmitted. BLE transmission is prioritized since BLE transmission has the highest priority order as shown in FIG. 6, the switching unit 19 is set to 19*c* in step S1002 in accordance with the flowchart in FIG. 10, and a BLE beacon packet is transmitted in step S1003. After this, in step S1004, the switching unit 19 is set to 19*b*. Here, while the switching unit 19 is set to 19*b* or 19*c*, data packet transmission by wireless LAN communication cannot be performed. Therefore, the wireless control unit 17 refers to the timer 18, and if the timing for transmitting the BLE beacon packet and the timing for transmitting the wireless LAN data packet are close, delays the timing for transmitting the wireless LAN data packet by a certain time (t2 in the drawing). Subsequently, after transmission of the BLE beacon packet is complete, the wireless LAN data packet is transmitted in accordance with the flowchart in FIG. 12.

This wireless LAN data packet that is delayed and transmitted is indicated by a packet 1509. An ACK packet received after this from the wireless LAN access point 6 that is a communication partner is indicated by 1510. After that, again, when the packet 1507 that is a data packet is transmitted normally, the packet 1508 that is an ACK packet in response to this packet is received. As is clear, due to a standby time (t2 in the drawing) for the transmission of the wireless LAN data packet, a decrease in the throughput of transmission of the wireless LAN data packet will occur.

FIG. 15C shows a parallel operation in the information processing apparatus 1 between data packet reception by BLE communication and data packet reception by wireless LAN communication. As described above, the packet 1501 indicates a beacon packet transmitted in BLE communication, and this is transmitted at a certain interval denoted by Tbeacon in accordance with the flowchart in FIG. 10.

Figure 11:
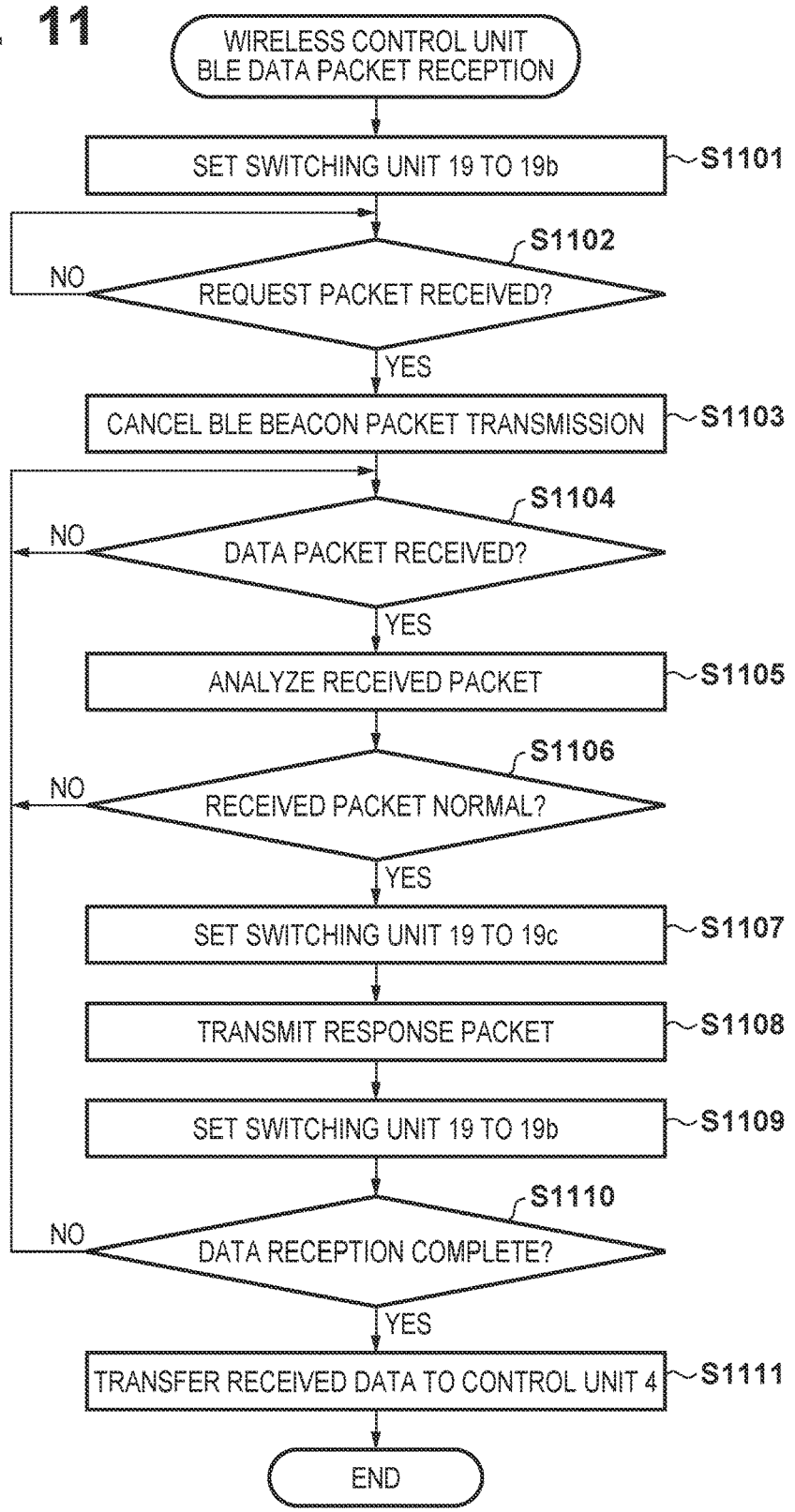
FIG. 11 is a flowchart of an operation in which the wireless control unit of the information processing apparatus receives a BLE data packet.

After this, data packet reception by BLE communication is performed in accordance with the flowchart in FIG. 11. On the other hand, the portable terminal device 5 that is a communication partner performs data packet transmission by BLE communication in accordance with the flowchart in FIG. 14. The portable terminal device 5 detects the packet 1501 that is a BLE beacon packet, and transmits a request packet in step S1406. In the information processing apparatus 1, it is determined that a request packet has been received in step S1102. This received request packet is indicated by a packet 1511.

After this, transition is performed to reception of BLE data packets, and thus in step S1103, transmission of BLE beacon packets is cancelled. In the portable terminal device 5, it is then determined that the data packet transmitted in step S1408 was received in step S1104 in the information processing apparatus 1, and in step S1108, a response packet is transmitted. This received data packet is indicated by a packet 1512. Also, the response packet that is transmitted for this packet is indicated by a packet 1513.

Here, assume that a packet 1514 that is a data received packet in wireless LAN communication was received during reception of the above request packet and BLE data packet. As shown in FIG. 6, along with reception in BLE communication and reception in wireless LAN communication, the switching unit 19 is set to 19*b*. However, the priority order of reception in BLE communication is higher than that of reception in wireless LAN communication, and thus the wireless control unit 17 prioritizes and performs BLE reception using the BLE communication unit 16. Therefore, the BLE request packet 1511 is received normally.

Also regarding the subsequent data packet 1512, the priority order of reception in BLE communication is higher, and thus the wireless control unit 17 prioritizes and performs BLE reception using the BLE communication unit 16, and receives the data packet 1512 normally. Therefore, it is determined in step S1106 that the data packet has been received normally, and the response packet 1513 is transmitted in step S1108, and thereby reception of the BLE data packet is performed normally. On the other hand, the priority order of reception of the wireless LAN is lower, and thus while BLE the request packet 1511 is being received, the received packet 1514 is not processed by the wireless LAN communication unit 15. Therefore, in determination in step S1304, the procedure returns to step S1302, where data packets are received, and thus an ACK packet is not transmitted.

On the other hand, in the wireless LAN access point 6 that is a communication partner of the wireless LAN, an ACK packet is not received in response to the packet 1514 that is a transmitted data packet, and thus the packet 1514 is resent in accordance with the communication control of the wireless LAN communication standard. This resent packet of the packet 1514 is indicated by a packet 1515. Note that, according to the communication control of the wireless LAN communication standard, if a data packet is resent due to an ACK packet not being detected, the packet needs to be resent after a certain time (t1 in the drawing) has elapsed.

However, even when the packet 1515 that is a resent packet is transmitted, a BLE data packet whose priority order is higher is received. Therefore, while the BLE data packet 1512 is being received, the received packet 1515 is not processed in the wireless LAN communication unit 15. Therefore, in determination in step S1304, the procedure returns to step S1302, where data packets are received, and thus, an ACK packet is not transmitted also this time.

Therefore, an ACK packet is not received in the wireless LAN access point 6, and thus, the packet 1515 will be resent again in accordance with the communication control of the wireless LAN communication standard. At this time point, data reception by BLE communication is complete, and the resent packet 1515 properly reaches the wireless LAN communication unit 15, and thus if it is determined in step S1304 that the packet is a normal packet, the information processing apparatus 1 transmits an ACK packet in step S1306. This is indicated by a packet 1516. After that, again, when a packet 1517 that is a data packet is received normally, a packet 1518 that is an ACK packet in response to this packet is transmitted. In this manner, if a wireless LAN data packet is received during reception of a request packet and a BLE data packet, the wireless LAN data packet is not received normally, and thus the data packet is resent. As is clear, due to this reception of the resent packet and a standby time (t3 in the drawing) for this reception, a decrease in the throughput of reception of the wireless LAN data packet will occur.

Next, an operation, in the information processing apparatus 1, of controlling the transmission interval of BLE beacon packets according to whether or not wireless LAN communication is used will be described in detail with reference to FIGS. 17A and 17B. FIGS. 17A and 17B show a parallel operation in the case where wireless LAN data packets are received during transmission of BLE beacon packets.

FIG. 17A shows a parallel operation when the transmission interval Tbeacon of BLE beacon packets is 30 mS. In BLE communication, beacon packets are transmitted in the above-described procedure, and this is indicated by a packet 1701. On the other hand, in wireless LAN communication, it is assumed that data transferred from the PC 7 has been received as a data packet via the wireless LAN access point 6.

First, the PC 7 transmits, via the wireless LAN access point 6, information regarding the type of data to be to be transmitted to the information processing apparatus 1. This information is received as a packet 1702 that is a wireless LAN data packet, by the information processing apparatus 1 in accordance with the flowchart in FIG. 13, and a packet 1703 that is an ACK packet is transmitted. This wireless LAN received data is then transferred to the control unit 4 in step S1309.

Figure 9:
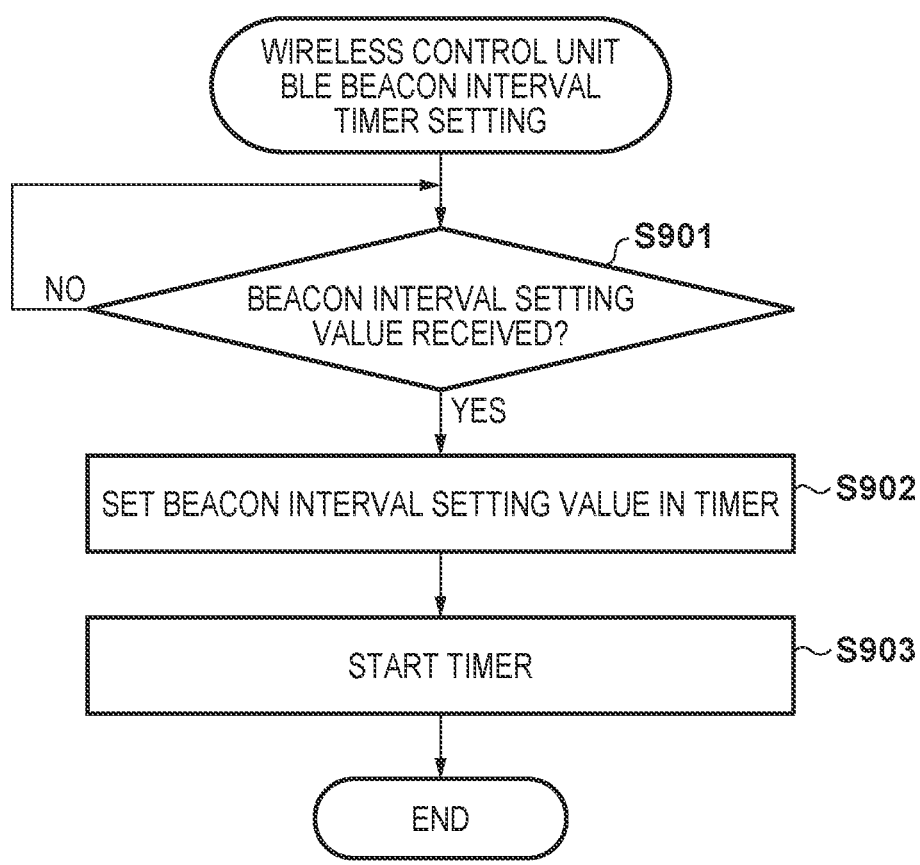
FIG. 9 is a flowchart of an operation in which a wireless control unit of the information processing apparatus performs timer setting of the BLE beacon interval.

In the wireless communication unit 3, the wireless control unit 17 receives this setting value based on the flowchart in FIG. 9, sets the BLE beacon interval as a timer value in step S902, and starts the timer in step S903. Therefore, after this, BLE beacon packets are transmitted at the interval Tbeacon of 30 mS that has been set, in accordance with the flowchart in FIG. 10. This is indicated by the packet 1701 in FIG. 17A.

After this, in wireless LAN communication, the PC 7 transfers data that corresponds to the above-described data type to the wireless LAN access point 6, and the data is divided into packets by the wireless LAN access point 6, and the packets are transmitted sequentially. On the other hand, the information processing apparatus 1 sequentially receives these packets in accordance with the flowchart in FIG. 13. In FIG. 17A, the data packet received normally by the information processing apparatus 1 is indicated by a packet 1704, and an ACK packet for this is indicated by a packet 1705.

However, as described above, if a wireless LAN received packet arrives at the timing at which a BLE beacon is sent out, this data packet is not received normally. A packet 1706 indicates the data packet that cannot be received normally, and therefore, a resent data packet is received, and this is indicated by a packet 1707. In addition, an ACK packet in the case where the resent packet has been received normally is indicated by a packet 1708. The wireless control unit 17 sequentially performs processing, and receives data packets. Upon receiving all the wireless LAN data packets in accordance with the communication control of the wireless LAN communication standard, the wireless control unit 17 determines in step S1308 that data reception is complete, and in step S1309, transfers the received data to the control unit 4.

FIG. 17B shows a parallel operation when the transmission interval Tbeacon of BLE beacon packets is 100 mS. In BLE communication, beacon packets are transmitted in the above-described procedure, and this is indicated by a packet 1709. On the other hand, in wireless LAN communication, it is assumed that data transferred from the PC 7 has been received as data packets via the wireless LAN access point 6.

First, the PC 7 transmits, via the wireless LAN access point 6, information regarding the type of data that is transmitted to the information processing apparatus 1. This is received in the information processing apparatus 1 as a packet 1710 that is a wireless LAN data packet, in accordance with the flowchart in FIG. 13, and a packet 1711 that is an ACK packet is transmitted. This wireless LAN received data is then transferred to the control unit 4 in step S1309.

In the wireless communication unit 3, the wireless control unit 17 receives this setting value based on the flowchart in FIG. 9, sets the BLE beacon interval as a timer value in step S902, and starts the timer in step S903. Therefore, after this, BLE beacon packets are transmitted at the interval Tbeacon of 100 mS that has been set, in accordance with the flowchart in FIG. 10. This is indicated by the packet 1709 in FIG. 17B.

After this, in wireless LAN communication, the PC 7 transfers data corresponding to the above-described data type to the wireless LAN access point 6, and the data is divided into packets by the wireless LAN access point 6 and the packets are transmitted sequentially. On the other hand, in the information processing apparatus 1, these packets are sequentially received in accordance with the flowchart in FIG. 13. In FIG. 17B, a data packet normally received by the information processing apparatus 1 is indicated by a packet 1712, and an ACK packet for this is indicated by a packet 1713.

However, as described above, if a wireless LAN received packet arrives at the timing at which BLE beacons are sent out, this data packet is not received normally. A packet 1714 indicates a data packet that cannot be received normally, and therefore, a data packet that has been resent is received, and this is indicated by a packet 1715. In addition, an ACK packet in the case where the resent packet has been received normally is indicated by a packet 1716. The wireless control unit 17 sequentially performs processing, and receives data packets. Upon receiving all the wireless LAN data packets in accordance with the communication control of the wire- less LAN communication standard, the wireless control unit 17 determines in step S1308 that data reception is complete, and in step S1309, transfers the received data to the control unit 4.

As is clear from comparison between the case of Tbeacon=30 mS in FIG. 17A and the case of Tbeacon=100 mS in FIG. 17B, if the interval Tbeacon is increased according to whether or not wireless LAN communication is used, it is possible to reduce the number of times a wireless LAN data packet is resent. It is also possible to reduce the number of times of occurrence of a resending delay time (t1 in the drawing) accompanied by resending. Therefore, it is possible to improve the throughput of data packet reception of the wireless LAN per unit time (t4) by increasing the beacon interval of BLE according to whether or not wireless LAN communication is used.

Next, a parallel operation in the case where wireless LAN data packets are transmitted during transmission of BLE beacon packets will be described with reference to FIGS. 18A and 18B.

FIG. 18A shows a parallel operation when the transmission interval Tbeacon of BLE beacon packets is 30 mS. In BLE communication, beacon packets are transmitted in the above-described procedure, and this is indicated by a packet 1801. Here, first, it is assumed that data transmission in wireless LAN communication to the PC 7 via the wireless LAN access point 6 has occurred in the information processing apparatus 1.

In the wireless communication unit 3, the wireless control unit 17 receives this setting value based on the flowchart in FIG. 9, sets the BLE beacon interval as a timer value in step S902, and starts the timer in step S903. Therefore, after this, BLE beacon packets are transmitted at the interval Tbeacon of 30 mS that has been set, in accordance with the flowchart in FIG. 10. This is indicated by the packet 1801 in FIG. 18A.

After this, in the information processing apparatus 1, the control unit 4 transfers wireless LAN transmission data to the wireless communication unit 3. This is received by the wireless control unit 17 in accordance with the flowchart in FIG. 12, and wireless LAN data packets are transmitted sequentially. In FIG. 18A, a data packet that is transmitted by the information processing apparatus 1 is indicated by a packet 1802, and an ACK packet that is received for this is indicated by a packet 1803.

However, as described above, a wireless LAN transmission packet that is transmitted at timing close to the timing at which BLE beacons are transmitted is delayed and transmitted after the BLE beacons are sent out. A packet 1804 indicates this delayed and transmitted packet, and an ACK packet that is received for the packet is indicated by a packet 1805. The wireless control unit 17 sequentially performs processing in this manner, and transmits data packets. When the wireless control unit 17 has transmitted all the wireless LAN data packets in accordance with the communication control of the wireless LAN communication standard, the wireless control unit 17 determines in step S1207 that data transmission is complete, and ends data transmission.

FIG. 18B shows a parallel operation when the transmission interval Tbeacon of BLE beacon packets is 100 mS. In BLE communication, beacon packets are transmitted in the above-described procedure, and this is indicated by a packet 1816. Here, it is assumed that data transmission in wireless LAN communication to the PC 7 via the wireless LAN access point 6 has occurred in the information processing apparatus 1.

In the wireless communication unit 3, the wireless control unit 17 receives this setting value based on the flowchart in FIG. 9, sets the BLE beacon interval as a timer value in step S902, and starts the timer in step S903. Therefore, after that, BLE beacon packets are transmitted at the interval Tbeacon of 100 mS that has been set, in accordance with the flowchart in FIG. 10. This is indicated by the packet 1816 in FIG. 18B.

After this, in the information processing apparatus 1, the control unit 4 transfers wireless LAN transmission data to the wireless communication unit 3. This is received by the wireless control unit 17 in accordance with the flowchart in FIG. 12, and wireless LAN data packets are transmitted sequentially. In FIG. 18B, a data packet transmitted by the information processing apparatus 1 is indicated by a packet 1807, and an ACK packet that is received for this is indicated by a packet 1808.

However, as described above, a wireless LAN transmission packet transmitted at timing close to the timing at which BLE beacons are transmitted is delayed and transmitted after the BLE beacons are transmitted. A packet 1809 indicates this delayed and transmitted packet, and an ACK packet that is received for this packet is indicated by a packet 1810. The wireless control unit 17 sequentially performs processing in this manner, and transmits data packets. When the wireless control unit 17 has transmitted all the wireless LAN data packets in accordance with the communication control of the wireless LAN communication standard, the wireless control unit 17 determines in step S1207 that data transmission is complete, and ends data transmission.

If the case of Tbeacon=30 mS in FIG. 18A is compared with the case of Tbeacon=100 mS in FIG. 18B, it is possible to reduce the number of times of occurrence of a delay time (t2 in the drawing) at the time when wireless LAN data packets are transmitted, according to whether or not wireless LAN communication is used. Accordingly, it is possible to improve the throughput of wireless LAN data packet transmission per unit time (t5) by increasing the BLE beacon interval according to whether or not wireless LAN communication is used.

As described above, the information processing apparatus 1 according to this embodiment can operate, in parallel, first wireless communication (BLE communication) and second wireless communication (wireless LAN communication) whose communication standard is different from that of the first wireless communication, by sequentially operating the first wireless communication and the second wireless communication. This information processing apparatus also determines whether or not a parallel operation in which the first wireless communication and the second wireless communication are operated in parallel is executed in addition to the first wireless communication, and decides the transmission interval in the first wireless communication based on the determination result. Specifically, the information processing apparatus 1 controls the transmission interval of BLE beacon packets according to whether or not a wireless LAN is used. It is then possible to mitigate a decrease in the throughput of wireless LAN communication by controlling the transmission interval of BLE beacon packets, when wireless LAN communication is used.

Moreover, in this embodiment, Tbeacon that denotes the beacon interval of BLE communication is switched between 100 mS and 30 mS in the case where wireless LAN communication is used and in the case where wireless LAN communication is not used. However, a configuration may be adopted in which an operation state of wireless LAN communication is determined in a more detailed manner, and Tbeacon is changed at a plurality of stages according to the operation state.

For example, a wireless LAN has two wireless communication modes, namely, an infrastructure mode for performing communication with the wireless LAN access point 6 and a WiFi direct mode for directly performing communication with the portable terminal device 5 without involving the wireless LAN access point 6. As shown in FIG. 19, the BLE beacon interval may be decided so as to change stepwise according to the valid/invalid states of these two modes. Note that as described above, it is conceivable to detect the position of the portable terminal device 5 using BLE beacons as a case example of an application used by the portable terminal device 5.

In this embodiment, if wireless LAN communication is used, Tbeacon that denotes the beacon interval of BLE communication is set to 100 mS, but if the beacon interval of BLE communication is set too large, there are cases where a function for detecting the position of the portable terminal device 5 is affected. In view of this, an upper limit value may be set in change of Tbeacon that denotes the beacon interval of BLE communication in the case where wireless LAN communication is used, so as to restrict the change within a range in which detection of the position of the portable terminal device 5 is not affected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-132774 filed on Jul. 4, 2016, which is hereby incorporated by reference herein in its entirety.

What is claimed is:

1. An information processing apparatus being capable of performing first wireless communication and second wireless communication whose communication standard is different from that of the first wireless communication, the apparatus comprising:
  a memory device that stores a program; and
  at least one processor that executes the program to set, as a transmission time interval, a time interval for periodically transmitting a predetermined type of data packet in the first wireless communication;
  a first wireless communication unit configured to perform the first wireless communication, wherein the first wireless communication unit periodically transmits the predetermined type of data packet in accordance with the set transmission time interval;
  a second wireless communication unit configured to perform the second wireless communication;
  a setting unit that sets whether or not to use the second wireless communication, wherein the second wireless communication periodically takes place between a time of the first wireless communication unit transmitting the predetermined type of data packet and a time of the first wireless communication unit transmitting a next predetermined type of data packet in accordance with the set transmission time interval;
  wherein the at least one processor
  sets, as the transmission time interval, a different time interval between a case that the setting unit sets to use the second wireless communication and a case that the setting unit sets not to use the second wireless communication.

2. The information processing apparatus according to claim 1, further comprising:
  a switching unit that switches between driving of the first wireless communication unit and driving of the second wireless communication unit; and
  a timing unit that times a predetermined time corresponding to the set transmission time interval, from when transmission in the first wireless communication is performed by the first wireless communication unit,
  wherein the at least one processor further executes the program to:
  cause the switching unit to, when transmission in the first wireless communication is performed by the first wireless communication unit, switch driving from the first wireless communication unit to the second wireless communication unit, and when the predetermined time is timed by the timing unit from when transmission in the first wireless communication is performed by the first wireless communication unit, switch driving from the second wireless communication unit to the first wireless communication unit.

3. The information processing apparatus according to claim 2, further comprising:
  an antenna compatible with the first wireless communication and the second wireless communication,
  wherein the switching unit switches driving by connecting one of the first wireless communication unit and the second wireless communication unit to the antenna.

4. The information processing apparatus according to claim 2,
  wherein the at least one processor further executes the program to, in a case where transmission or reception in the first wireless communication overlaps transmission or reception in the second wireless communication, prioritize execution of the transmission or reception in the first wireless communication, and delay the transmission or reception in the second wireless communication.

5. The information processing apparatus according to claim 1,
wherein the at least one processor further executes the program to set, respectively, communication by the first wireless communication and communication by the second wireless communication to valid or invalid in accordance with user input.

6. The information processing apparatus according to claim 5,
wherein the setting unit sets, based on a setting state, whether or not to use the second wireless communication.

7. The information processing apparatus according to claim 1,
wherein the first wireless communication unit periodically transmits packets including attribute information for identifying the information processing apparatus in accordance with the set transmission time interval.

8. The information processing apparatus according to claim 1,
wherein the second wireless communication has a plurality of modes, and
the at least one processor further executes the instructions to set the transmission time interval of the first wireless communication so as to change stepwise according to which mode is valid out of the modes of the second wireless communication in addition to the first wireless communication.

9. The information processing apparatus according to claim 1,
wherein the first wireless communication is communication by a Bluetooth Low Energy standard, and
the second wireless communication is communication by an IEEE 802.11 standard.

10. A control method for an information processing apparatus being capable of performing first wireless communication and second wireless communication whose communication standard is different from that of the first wireless communication, and that includes a first wireless communication unit configured to perform the first wireless communication, a second wireless communication unit configured to perform the second wireless communication, a memory device that stores a program, and at least one processor that executes the program, the control method comprising:
setting, as a transmission time interval, a time interval for periodically transmitting a predetermined type of data packet in the first wireless communication, wherein the first wireless communication unit periodically transmits the predetermined type of data packet in accordance with a set transmission time interval;
setting whether or not to use the second wireless communication, wherein the second wireless communication periodically takes place between a time of the first wireless communication unit transmitting the predetermined type of data packet and a time of the first wireless communication unit transmitting a next predetermined type of data packet in accordance with the set transmission time interval; and
setting, as the transmission time interval, a different time interval between a case that the setting unit sets to use the second wireless communication and a case that the setting unit sets not to use the second wireless communication.

11. A non-transitory computer-readable storage medium storing a computer program for causing a computer to execute steps of a control method for an information processing apparatus being capable of performing first wireless communication and second wireless communication whose communication standard is different from that of the first wireless communication, and that includes a first wireless communication unit configured to perform the first wireless communication, a second wireless communication unit configured to perform the second wireless communication, a memory device that stores a program, and at least one processor that executes the program, the control method comprising:
setting, as a transmission time interval, a time interval for periodically transmitting a predetermined type of data packet in the first wireless communication, wherein the first wireless communication unit periodically transmits the predetermined type of data packet in accordance with a set transmission time interval;
setting whether or not to use the second wireless communication, wherein the second wireless communication periodically takes place between a time of the first wireless communication unit transmitting the predetermined type of data packet and a time of the first wireless communication unit transmitting a next predetermined type of data packet in accordance with the set transmission time interval; and
setting, as the transmission time interval, a different time interval between a case that the setting unit sets to use the second wireless communication and a case that the setting unit sets not to use the second wireless communication.

12. The information processing apparatus according to claim 1,
wherein the at least one processor sets as the transmission time interval, in a case where the setting unit sets to use the second wireless communication, a time interval longer than a time interval set when setting not to use the second wireless communication.

13. The information processing apparatus according to claim 1,
wherein the predetermined type of data packet includes information to be used for specifying the information processing apparatus.

14. The information processing apparatus according to claim 1,
a time interval value set as the transmission time interval is longer than zero.

15. The information processing apparatus according to claim 1,
wherein the first wireless communication unit periodically and repeatedly transmits the predetermined type of data packet with the set transmission time interval.

16. The information processing apparatus according to claim 1,
wherein the first wireless communication unit receives, from a portable terminal which has received the predetermined type of data packet transmitted by the first wireless communication unit, a data packet requesting for connecting the information processing apparatus to communicate with the information processing apparatus, and
stop to transmit the predetermined type of data packet based on reception of the requesting data packet.

17. The information processing apparatus according to claim 1,
wherein a distance between the portable terminal receiving the predetermined type of data packet and the information processing apparatus is estimated based on a received signal strength of the predetermined type of data packet.

18. The information processing apparatus according to claim 1, wherein the at least one processor:

sets, as the transmission time interval, a first time interval based on the setting such that the second wireless communication is used, and sets, as the transmission time interval, a second time interval based on the setting such that the second wireless communication is not used, the first time interval being longer than the second time interval.

19. The information processing apparatus according to claim 1, wherein the setting unit accepts an instruction from a user, and sets, based on the instruction accepted from the user, whether or not to use the second wireless communication, and wherein the at least one processor sets, as the transmission time interval, a time interval corresponding to the setting about whether or not to use the second wireless communication.

20. The information processing apparatus according to claim 1, wherein the first wireless communication and the second wireless communication use a same radio band.

* * * * *